US011277220B2

(12) United States Patent
Mukherjee et al.

(10) Patent No.: US 11,277,220 B2
(45) Date of Patent: Mar. 15, 2022

(54) MULTIPLEXING OF DIFFERENT TRAFFIC TYPES IN A TELECOMMUNICATIONS NETWORK

(71) Applicant: Telefonaktiebolaget LM Ericsson (publ), Stockholm (SE)

(72) Inventors: Amitav Mukherjee, Fremont, CA (US); Peter Alriksson, Hörby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 230 days.

(21) Appl. No.: 16/633,690

(22) PCT Filed: Jun. 21, 2018

(86) PCT No.: PCT/SE2018/050675
§ 371 (c)(1),
(2) Date: Jan. 24, 2020

(87) PCT Pub. No.: WO2019/032003
PCT Pub. Date: Feb. 14, 2019

(65) Prior Publication Data
US 2020/0228230 A1    Jul. 16, 2020

Related U.S. Application Data

(60) Provisional application No. 62/544,283, filed on Aug. 11, 2017.

(51) Int. Cl.
*H04L 1/00*    (2006.01)
*H04L 1/18*    (2006.01)
(Continued)

(52) U.S. Cl.
CPC .......... *H04L 1/0013* (2013.01); *H04L 1/1819* (2013.01); *H04L 1/1896* (2013.01);
(Continued)

(58) Field of Classification Search
CPC ... H04L 1/0013; H04L 1/1819; H04L 1/1896; H04L 5/0055; H04W 74/0808
See application file for complete search history.

(56) References Cited

U.S. PATENT DOCUMENTS

2011/0310986 A1\* 12/2011 Heo ...................... H04W 76/27
375/259
2017/0079013 A1\* 3/2017 Noh ........................ H04L 1/187
(Continued)

OTHER PUBLICATIONS

Author Unknown, ""3rd Generation Partnership Project; Technical Specification Group Radio Access Network; Evolved Universal Terrestrial Radio Access (E-UTRA); Physical layer procedures(Release 14),"" 3GPP TS 36.213 V14.3.0, Jun. 2017, 3GPP Organizational Partners, 460 pages.

(Continued)

*Primary Examiner* — Jael M Ulysse
(74) *Attorney, Agent, or Firm* — Withrow & Terranova, PLLC

(57) ABSTRACT

Methods and systems for multiplexing of different traffic types in a telecommunications network are provided. According to one aspect, a method of operation of a network node comprises: determining that data is available for a Downlink (DL) transmission of a first traffic type to a User Equipment (UE); identifying a DL transmission of a second traffic type to be punctured; transmitting the DL transmission of the first traffic type by puncturing the identified DL transmission of the second traffic type; receiving a Hybrid Automatic Repeat Request (HARQ) Negative Acknowledgement (NACK) associated with the punctured DL transmission of the second traffic type; and excluding the HARQ NACK associated with the punctured DL transmission of the second traffic type from a DL Contention Window Size (CWS) adjustment operation of the network node.

24 Claims, 15 Drawing Sheets

(51) Int. Cl.
  *H04L 5/00* (2006.01)
  *H04W 16/14* (2009.01)
  *H04W 74/08* (2009.01)

(52) U.S. Cl.
  CPC .......... *H04L 5/0055* (2013.01); *H04W 16/14* (2013.01); *H04W 74/0808* (2013.01)

(56) References Cited

U.S. PATENT DOCUMENTS

| | | | | |
|---|---|---|---|---|
| 2018/0191470 A1* | 7/2018 | Manolakos | ........... | H04L 1/1854 |
| 2018/0278454 A1* | 9/2018 | Islam | .................... | H04L 5/0091 |
| 2018/0368110 A1* | 12/2018 | Ying | ..................... | H04L 5/0044 |
| 2019/0174440 A1* | 6/2019 | Kwak | ..................... | H04L 25/00 |
| 2019/0174472 A1* | 6/2019 | Lee | .................... | H04W 72/044 |
| 2019/0254058 A1* | 8/2019 | Xie | ....................... | H04L 5/0064 |
| 2020/0059327 A1* | 2/2020 | Kini | .................... | H04W 72/042 |

OTHER PUBLICATIONS

Author Unknown, ""3rd Generation Partnership Project; Technical Specification Group Radio Access Network; NR; Physical layer procedures for control(Release 15),"" 3GPP TS 38.213 V0.0.1, Jul. 2017, 3GPP Organizational Partners, 14 pages.

Author Unknown, "3rd Generation Partnership Project; Technical Specification Group Radio Access Network; NR Radio Resource Control (RRC); Protocol specification (Release 15)," 3GPP TS 38.331 V 0.0.4, Jun. 2017, 22 pages.

Intel Corporation, "R1-156511: Remaining Details on HARQ Feedback Based CW Adaptation," 3GPP TSG RAN WG1 Meeting #83, Nov. 15-22, 2015, Anaheim, USA, 5 pages.

ZTE, "R1-166408: Multiplexing of eMBB and URLLC," 3GPP TSG RAN WG 1Meeting #86, Aug. 22-26, 2016, Gothenburg, Sweden, 10 pages.

Invitation to Pay Additional Fees and Partial International Search for International Patent Application No. PCT/SE2018/050675, dated Oct. 11, 2018, 14 pages.

International Search Report and Written Opinion for International Patent Application No. PCT/SE2018/050675, dated Dec. 4, 2018, 17 pages.

* cited by examiner

MULTIPLEXING OF DIFFERENT TRAFFIC TYPES IN A TELECOMMUNICATIONS NETWORK

RELATED APPLICATIONS

This application is a 35 U.S.C. § 371 national phase filing of International Application No. PCT/SE2018/050675, filed Jun. 21, 2018, which claims the benefit of provisional patent application Ser. No. 62/544,283, filed Aug. 11, 2017, the disclosures of which are hereby incorporated herein by reference in their entireties.

TECHNICAL FIELD

The present disclosure relates to multiplexing of different traffic types in a telecommunications network, including multiplexing Enhanced Mobile Broadband (eMBB) and Ultra-Reliable and Low Latency Communications (URLLC) traffic in a New Radio (NR) Unlicensed (NR-U) communications network.

BACKGROUND

Long Term Evolution (LTE)

FIG. 1 illustrates the structure of a conventional LTE transmission stream comprising a series of radio frames, a portion of which are labeled in FIG. 1 as Radio Frame N−1, Radio Frame N, and Radio Frame N+1. Each LTE radio frame is 10 milliseconds (ms) in duration, and comprises 10 subframes labeled SF0 through SF9. Each subframe is 1 ms in duration, and comprises two slots labeled Slot 0 and Slot 1. Each slot is 0.5 ms in duration, and comprises some number of Orthogonal Frequency Division Multiplexing (OFDM) symbols. In the embodiment illustrated in FIG. 1, each slot comprises 7 OFDM symbols, numbered 0 through 6. Each OFDM symbol contains a prefix.

LTE wireless communication technology uses OFDM in the downlink and Discrete Fourier Transform (DFT)-spread OFDM in the uplink. The radio frame thus occupies a frequency bandwidth that is divided into multiple subcarriers, as shown in FIG. 2.

FIG. 2 illustrates the basic LTE Downlink (DL) physical resource as a time-frequency grid, where each row represents a subcarrier (which may also be referred to as "an OFDM subcarrier") and each column represents a unit of time. In the embodiment illustrated in FIG. 2, the frequency bandwidth is divided into multiple subcarriers of 15 Kilohertz (kHz) bandwidth each, and each unit of time is one OFDM symbol. Each cell in this grid is called a Resource Element (RE) and corresponds to one OFDM subcarrier during one OFDM symbol interval. The bandwidth of a standard LTE DL frame may be, for example, 72, 180, 300, 600, 900, or 1200 subcarriers.

FIG. 3 illustrates an example LTE resource allocation. In LTE, the physical resources, such as the DL physical resources represented by the time-frequency grid in FIG. 2, are typically allocated in terms of Resource Blocks (RBs), which may also be referred to as Physical Resource Blocks (PRBs). A RB corresponds to one slot (0.5 ms) in the time domain and 12 contiguous subcarriers in the frequency domain. A pair of two adjacent RBs in time direction (1.0 ms) is known as a RB pair. An example RB pair is shown in FIG. 3. RBs are numbered in the frequency domain, starting with 0 from one end of the system bandwidth.

FIG. 4 illustrates a portion of an LTE DL radio frame, showing how the time-frequency grid is divided into multiple PRBs.

New Radio (NR)

Currently the Fifth Generation (5G) of cellular system, called New Radio (NR) is being standardized in Third Generation Partnership Project (3GPP). NR is developed for maximum flexibility to support multiple and substantially different use cases, in both licensed and unlicensed spectrum. In addition to the typical Mobile Broadband (MBB) or Enhanced MBB (eMBB) use cases, Machine Type Communication (MTC), Ultra-Reliable and Low Latency Communications (URLLC), side-link Device-To-Device (D2D) and several other use cases are also supported.

URLLC data, for example, is characterized by requirements for very low packet error rate and minimal over-the-air latency. For this reason, URLLC transmissions may be prioritized over eMBB transmissions on both the downlink and uplink, such that a URLLC transmission may preemptively occupy resources that had been scheduled for ongoing eMBB traffic, a process known as "puncturing." For example, on-going eMBB transmissions may be punctured or interrupted by URLLC transmissions on the same resources. Alternatively, the URLLC and eMBB transmissions may be scheduled on non-overlapping resources such that the URLLC transmission does not puncture the eMBB transmission. Grant-free UL transmissions were also introduced to support URLLC in NR.

FIGS. 5 and 6 illustrate resource allocation in NR. In NR, the basic scheduling unit is called a slot. A slot consists of either 7 or 14 OFDM symbols for the normal cyclic prefix configuration. FIG. 5 illustrates an example 14-symbol NR slot, while FIG. 6 illustrates a 7-symbol NR slot. 7-symbol NR slots are only available when the subcarrier spacing is 60 kHz or lower. As an example, a slot with 7 symbols at 60 kHz subcarrier spacing is 125 microseconds (µs) long. The first OFDM symbol(s) of a slot contains control information for the User Equipment (UE), which is referred to as the "control region." This control information can for example be downlink assignments or uplink grants.

NR: Mini-Slots

To reduce latencies, a mechanism called mini-slots has been introduced in NR. A mini-slot is, as the name suggests, a slot that has fewer OFDM symbols than a regular slot. Current agreements allow mini-slots of length 1 to 14 OFDM symbols.

NR: Flexible Bandwidth Configurations

NR also supports flexible bandwidth configurations for different UEs on the same serving cell. In other words, the bandwidth monitored by a UE and used for its control and data channels may be smaller than the carrier bandwidth. One or multiple bandwidth part configurations for each component carrier can be semi-statically signaled to a UE, where a bandwidth part consists of a group of contiguous PRBs. Reserved resources can be configured within the bandwidth part. The bandwidth of a bandwidth part equals to or is smaller than the maximal bandwidth capability supported by a UE.

NR: Code Block Group Hybrid Automatic Repeat Request (HARQ)

In NR, the option of configuring a UE with code block group HARQ feedback exists. This option implies that the UE can send HARQ feedback not only for individual code words, but also for groups of code blocks within a code word. The number of code block groups per code word is configurable by the NR Base Station (gNB).

Operation in Unlicensed Spectrum

3GPP and MulteFire Alliance have previously specified LTE-based systems that operate in unlicensed spectrum; for example, License Assisted Access (LAA) in 3GPP Release (Rel-) 13, Rel-14, and Rel-15. NR is also being designed for unlicensed spectrum operation (i.e., NR Unlicensed (NR-U)).

FIG. 7 illustrates a telecommunication network 10 having a first base station 12-1 that supports a primary cell 14 and a second base station 12-2 that supports a secondary cell 16. In the embodiment illustrated in FIG. 7, the primary cell 14 operates on a first frequency (f1) that is a licensed band (e.g., LTE) and the secondary cell 16 operates on a second frequency (f2) that is an unlicensed band. In the embodiment illustrated in FIG. 7, a UE 18 operates within both the primary cell 14 and the secondary cell 16. Both base stations 12-1 and 12-2 (which may be collectively referred to as "base stations 12" or "base station 12") communicate with each other and with a core network 20.

For a node to be allowed to transmit in unlicensed spectrum, e.g., the 5 Gigahertz (GHz) band, it typically needs to perform a Clear Channel Assessment (CCA). This procedure typically includes sensing the medium to be idle for a number of time intervals. Sensing the medium to be idle can be done in different ways, e.g., using energy detection, preamble detection, or virtual carrier sensing, where the latter implies that the node reads control information from other transmitting nodes informing when a transmission ends. After sensing the medium to be idle, a node is typically allowed to transmit for a certain amount of time, sometimes referred to as Transmission Opportunity (TXOP). The length of the TXOP depends on regional regulations and the type of CCA that has been performed, but typically ranges from 1 ms to 10 ms.

In LAA, the DL Contention Window Size (CWS) for Listen-Before-Talk (LBT) defines the range of the backoff counter that is randomly drawn to determine the channel sensing duration prior to a DL transmission. The DL CWS is doubled if more than 80% of HARQ feedback values for a reference Physical Downlink Shared Channel (PDSCH) subframe are Negative Acknowledgements (NACKs). The allowed CWS sizes are related to the channel access priority class. The channel access priority classes and corresponding CWS defined for LAA and MulteFire are shown in Table 1. If the channel has not been sensed to be idle in a slot duration when the Evolved or Enhanced Node B (eNB) first senses the channel after it is ready to transmit or if the channel has been sensed to be not idle during any of the slot durations of a defer duration immediately before this intended transmission, the eNB draws a new random number and starts the back-off procedure after sensing the channel to be idle during the slot durations of a defer duration $T_d$. The defer duration $T_d$ consists of duration $T_f=16$ μs immediately followed by $m_p$ consecutive slot durations where each slot duration is $T_{sl}=9$ μs, and $T_f$ includes an idle slot duration $T_1$ at start of $T_f$.

TABLE 1

Channel Access Priority Class [Technical Specification (TS) 36.213 Section 15.1.1]

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The multiplexing of URLLC and eMBB traffic has implications for how channel access, resource allocation, and physical-layer procedures are performed in NR-U. For example, reusing existing channel access principles from LAA, which did not have URLLC traffic, can be suboptimal. Methods are also needed to prioritize URLLC data and control information transmissions within a TXOP.

SUMMARY

The invention proposes methods and network entities for efficient multiplexing of different traffic types in a telecommunications network, including, but not limited to, multiplexing of Enhanced Mobile Broadband (eMBB) and Ultra-Reliable Low Latency Communications (URLLC) transmissions in unlicensed spectrum.

The following advantages have been identified:
More efficient channel access when eMBB and URLLC transmissions are multiplexed;
More efficient resource allocation for URLLC transmissions; and
More efficient Hybrid Automatic Repeat Request (HARQ) feedback.

According to one aspect of the present disclosure, a method of operation of a network node comprises: determining that data is available for Downlink (DL) transmission of a first traffic type to a User Equipment (UE); identifying a DL transmission of a second traffic type to be punctured; transmitting the DL transmission of the first traffic type by puncturing the identified DL transmission of the second traffic type; receiving a Hybrid Automatic Repeat Request (HARQ) Negative Acknowledgement (NACK) associated with the punctured DL transmission of the second traffic type; and excluding the HARQ NACK associated with the punctured DL transmission of the second traffic type from a DL Contention Window Size (CWS) adjustment operation of the network node.

In some embodiments, the network node comprises a Fifth Generation (5G) New Radio (NR) Base Station (gNB).

In some embodiments, the DL transmission of the first traffic type comprises an Ultra-Reliable Low Latency Communications (URLLC) transmission.

In some embodiments, the DL transmission of the second traffic type comprises a non-URLLC transmission.

In some embodiments, the non-URLLC transmission comprises an Enhanced Mobile Broadband (eMBB) transmission.

In some embodiments, the DL transmissions of the first and second traffic types comprise DL transmission in an unlicensed spectrum.

According to another aspect of the present disclosure, a method of operation of a network node comprises: defining a channel access priority class 0 for a Transmit Opportunity (TXOP) comprising one or more symbols of data of a first traffic type only, for use during a CWS calculation; and transmitting DL data of the first traffic type only to a UE according to the channel access priority class 0.

In some embodiments, the data of the first traffic type comprises URLLC data only.

In some embodiments, the network node comprises a 5G gNB.

In some embodiments, the method further comprises: after transmitting the DL data according to the channel access priority class 0, determining that data is available for a DL transmission of a second traffic type to the UE; and in response to determining that the data is available for the DL transmission of the second traffic type to the UE, performing a post-backoff procedure prior to starting a channel sensing procedure for the DL transmission of the second traffic type.

In some embodiments, the DL transmission of the second traffic type comprises a non-URLLC transmission.

In some embodiments, the non-URLLC transmission comprises an eMBB transmission.

In some embodiments, transmitting the DL data comprises transmitting the DL data in an unlicensed spectrum.

According to another aspect of the present disclosure, a method of operation of a UE comprises: determining that data is available for Uplink (UL) transmission of a first traffic type to a network node; identifying an UL transmission of a second traffic type to be punctured; transmitting the UL transmission of the first traffic type by puncturing the identified UL transmission of the second traffic type; receiving a HARQ NACK associated with the punctured UL transmission of the second traffic type; and excluding the HARQ NACK associated with the punctured UL transmission of the second traffic type from a UL CWS adjustment operation of the UE.

In some embodiments, the network node comprises a 5G gNB.

In some embodiments, the UL transmission of the first traffic type comprises an URLLC transmission.

In some embodiments, the UL transmission of the second traffic type comprises a non-URLLC transmission.

In some embodiments, the non-URLLC transmission comprises an eMBB transmission.

In some embodiments, the UL transmissions of the first and second traffic types comprise UL transmission in an unlicensed spectrum.

According to another aspect of the present disclosure, a method of operation of a UE comprises: defining a channel access priority class 0 for a TXOP comprising one or more symbols of data of a first traffic type only, for use during a CWS calculation; and transmitting UL data of the first traffic type only to a network node according to the channel access priority class 0.

In some embodiments, the data of the first traffic type comprises URLLC data only.

In some embodiments, the network node comprises a 5G gNB.

In some embodiments, the method further comprises: after transmitting the UL data according to the channel access priority class 0, determining that data is available for a UL transmission of a second traffic type to the network node; and in response to determining that the data is available for the UL transmission of the second traffic type to the network node, performing a post-backoff procedure prior to starting a channel sensing procedure for the UL transmission of the second traffic type.

In some embodiments, the UL transmission of the second traffic type comprises a non-URLLC transmission.

In some embodiments, the non-URLLC transmission comprises an eMBB transmission.

In some embodiments, transmitting the UL data comprises transmitting the UL data in an unlicensed spectrum.

According to another aspect of the present disclosure, a network node comprises: one or more processors; and memory comprising instructions executable by the one or more processors, whereby the network node is adapted to: determine that data is available for a DL transmission of a first traffic type to a UE; identify a DL transmission of a second traffic type to be punctured; transmit the DL transmission of the first traffic type by puncturing the identified DL transmission of the second traffic type; receive a HARQ NACK associated with the punctured DL transmission of the second traffic type; and exclude the HARQ NACK associated with the punctured DL transmission of the second traffic type from a DL CWS adjustment operation of the network node.

In some embodiments, the network node comprises a 5G gNB.

In some embodiments, the DL transmission of the first traffic type comprises an URLLC transmission.

In some embodiments, the DL transmission of the second traffic type comprises a non-URLLC transmission.

In some embodiments, the non-URLLC transmission comprises an eMBB transmission.

In some embodiments, the DL transmissions of the first and second traffic types comprise DL transmissions in an unlicensed spectrum.

According to another aspect of the present disclosure, a network node comprises: one or more processors; and memory comprising instructions executable by the one or more processors, whereby the network node is adapted to: define a channel access priority class 0 for a TXOP comprising one or more symbols of data of a first traffic type only, for use during a CWS calculation; and transmit DL data of the first traffic type only to a UE according to the channel access priority class 0.

In some embodiments, the data of the first traffic type comprises URLLC data only.

In some embodiments, the network node comprises a 5G gNB.

In some embodiments, transmitting the DL data of the first traffic type comprises transmitting the DL data of the first traffic type in in an unlicensed spectrum.

In some embodiments, the network node is further adapted to: after transmitting the DL data according to the channel access priority class 0, determine that data is available for a DL transmission of a second traffic type to the UE; and in response to determining that the data is available for the DL transmission of the second traffic type to the UE, perform a post-backoff procedure prior to starting a channel sensing procedure for the DL transmission of the second traffic type.

In some embodiments, the DL transmission of the second traffic type comprises a non-URLLC transmission.

In some embodiments, the non-URLLC transmission comprises an eMBB transmission.

In some embodiments, the DL transmission of a second traffic type comprises a DL transmission in an unlicensed spectrum.

According to another aspect of the present disclosure, a network node adapted to operate according to any of the network node methods disclosed herein According to another aspect of the present disclosure, a non-transitory computer readable medium stores software instructions that when executed by one or more processors of a network node cause the network node to carry out any of the network node methods disclosed herein.

According to another aspect of the present disclosure, a computer program comprises instructions which, when executed on one or more processors, cause the one or more processors to carry out any of the network node methods disclosed herein.

According to another aspect of the present disclosure, a carrier containing the computer program above, wherein the carrier is one of an electronic signal, an optical signal, a radio signal, or a computer readable storage medium.

According to another aspect of the present disclosure, a UE comprising: one or more processors; and memory comprising instructions executable by the one or more processors, whereby the UE is adapted to: determine that data is available for UL transmission of a first traffic type to a network node; identify an UL transmission of a second traffic type to be punctured; transmit the UL transmission of the first traffic type by puncturing the identified UL transmission of the second traffic type; receive a HARQ NACK associated with the punctured UL transmission of the second traffic type; and exclude the HARQ NACK associated with the punctured UL transmission of the second traffic type from a UL CWS adjustment operation of the UE.

In some embodiments, the network node comprises a 5G gNB.

In some embodiments, the UL transmission of the first traffic type comprises an URLLC transmission.

In some embodiments, the UL transmission of the second traffic type comprises a non-URLLC transmission.

In some embodiments, the non-URLLC transmission comprises an eMBB transmission.

In some embodiments, the UL transmissions of the first and second traffic types comprise UL transmission in an unlicensed spectrum.

According to another aspect of the present disclosure, a UE comprises: one or more processors; and memory comprising instructions executable by the one or more processors, whereby the UE is adapted to: define a channel access priority class 0 for a TXOP comprising one or more symbols of data of a first traffic type only, for use during a CWS calculation; and transmit UL data of the first traffic type only to a network node according to the channel access priority class 0.

In some embodiments, the data of the first traffic type comprises URLLC data only.

In some embodiments, the network node comprises a 5G gNB.

In some embodiments, transmitting the UL data of the first traffic type comprises transmitting the UL data of the first traffic type in in an unlicensed spectrum.

In some embodiments, the UE is further adapted to: after transmitting the UL data according to the channel access priority class 0, determine that data is available for a UL transmission of a second traffic type to the network node; and in response to determining that the data is available for the UL transmission of the second traffic type to the network node, perform a post-backoff procedure prior to starting a channel sensing procedure for the UL transmission of the second traffic type.

In some embodiments, the UL transmission of the second traffic type comprises a non-URLLC transmission.

In some embodiments, the non-URLLC transmission comprises an eMBB transmission.

In some embodiments, the UL transmission of a second traffic type comprises an UL transmission in an unlicensed spectrum.

According to another aspect of the present disclosure, a UE adapted to operate according to any of the UE methods disclosed herein.

According to another aspect of the present disclosure, a non-transitory computer readable medium stores software instructions that when executed by one or more processors of a UE cause the UE to carry out any of the UE methods disclosed herein.

According to another aspect of the present disclosure, a computer program comprises instructions which, when executed on one or more processors, cause the one or more processors to carry out any of the UE methods disclosed herein.

According to another aspect of the present disclosure, a carrier containing the computer program above, wherein the carrier is one of an electronic signal, an optical signal, a radio signal, or a computer readable storage medium.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) Base Station (gNB) in a Third Generation Partnership Project (3GPP)

Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that, in the description herein, reference may be made to the term "cell"; however, particularly with respect to 5G NR concepts, beams may be used instead of cells and, as such, it is important to note that the concepts described herein are equally applicable to both cells and beams.

The invention proposes methods for efficient multiplexing of traffic of different traffic types, including, but not limited to, multiplexing of Enhanced Mobile Broadband (eMBB) and Ultra-Reliable Low Latency Communications (URLLC) transmissions in unlicensed spectrum.

The following embodiments are applicable to various types of communications networks, including, but not limited to, both non-standalone and standalone NR Unlicensed (NR-U) systems, as well as NR-based technologies such as MulteFire evolution.

Figure 8:
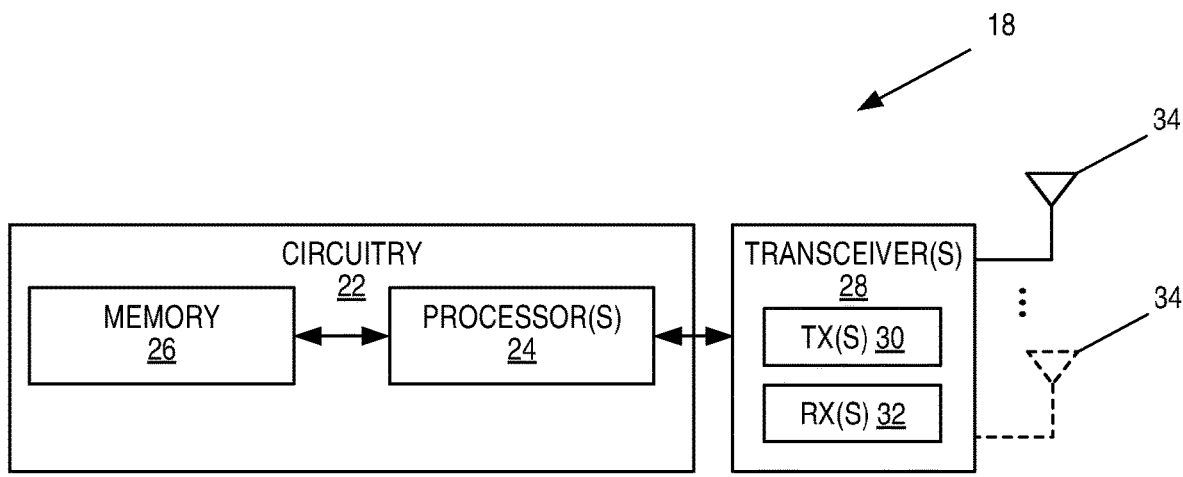
FIGS. 8 and 9 illustrate example embodiments of a User Equipment (UE) or other type of wireless device.

FIG. 8 is a schematic block diagram of a UE 18 (which may also be referred to as "wireless device 18") according to some embodiments of the present disclosure. As illustrated, the wireless device 18 includes processing circuitry 22 comprising one or more processors 24 (e.g., Central Processing Units (CPUs), Application Specific Integrated Circuits (ASICs), Field Programmable Gate Arrays (FPGAs), Digital Signal Processors (DSPs), and/or the like) and memory 26. The UE 18 also includes one or more transceivers 28 each including one or more transmitters 30 and one or more receivers 32 coupled to one or more antennas 34. In some embodiments, the functionality of the wireless device 18 described above may be implemented in hardware (e.g., via hardware within the circuitry 22 and/or within the one or more processors 24) or be implemented in a combination of hardware and software (e.g., fully or partially implemented in software that is, e.g., stored in the memory 26 and executed by the one or more processors 24).

In some embodiments, a computer program including instructions which, when executed by the one or more processors 24, causes the one or more processors 24 to carry out at least some of the functionality of the wireless device 18 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
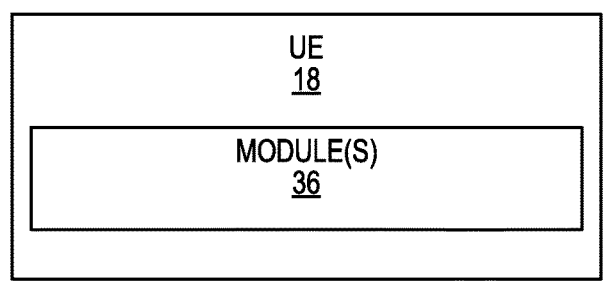

FIG. 9 is a schematic block diagram of the wireless device 18 according to some other embodiments of the present disclosure. The UE 18 includes one or more modules 36, each of which is implemented in software. The module(s) 36 provide the functionality of the wireless device 18 described herein.

Figure 10:
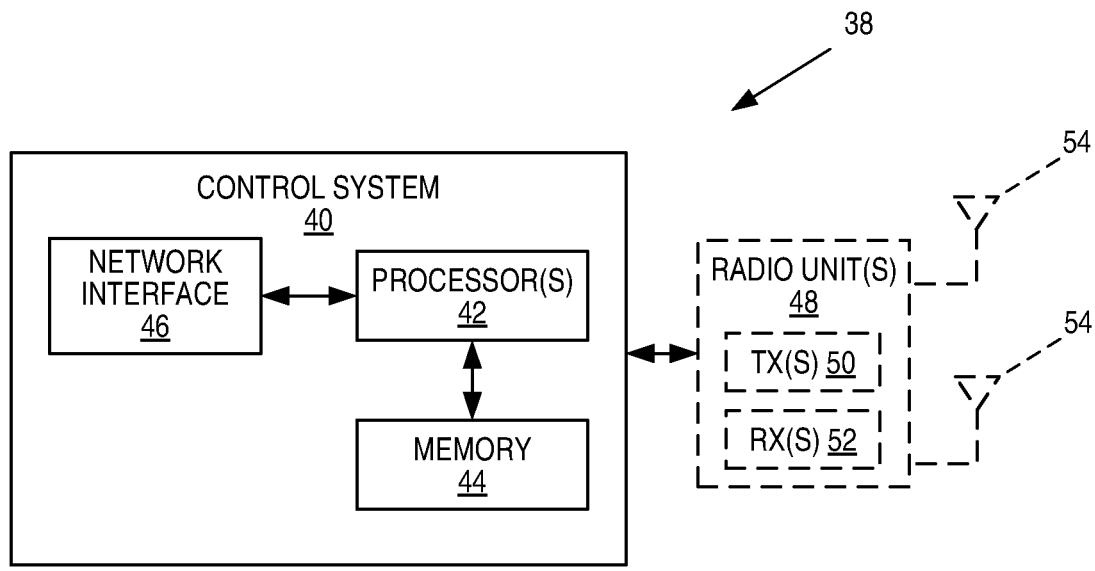
FIGS. 10 through 12 illustrate example embodiments of a network node.

FIG. 10 is a schematic block diagram of a network node 38 (e.g., a gNB) according to some embodiments of the present disclosure. As illustrated, the network node 38 includes a control system 40 that includes circuitry comprising one or more processors 42 (e.g., CPUs, ASICs, DSPs, FPGAs, and/or the like) and memory 44. In the embodiment illustrated in FIG. 10, the control system 40 also includes a network interface 46. In embodiments in which the network node 38 is a radio access node, the network node 38 also includes one or more radio units 48 that each include one or more transmitters 50 and one or more receivers 52 coupled to one or more antennas 54. In some embodiments, the functionality of the radio access node 38 described above may be fully or partially implemented in software that is, e.g., stored in the memory 44 and executed by the one or more processor(s) 42.

Figure 11:
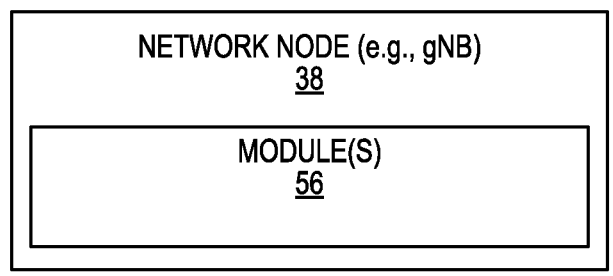

FIG. 11 is a schematic block diagram of the network node 38 (which may be, e.g., a gNB) according to some other embodiments of the present disclosure. The network node 38 includes one or more modules 56, each of which is implemented in software. The module(s) 56 provide the functionality of the network node 38, and particularly of a gNB, described herein.

Figure 12:
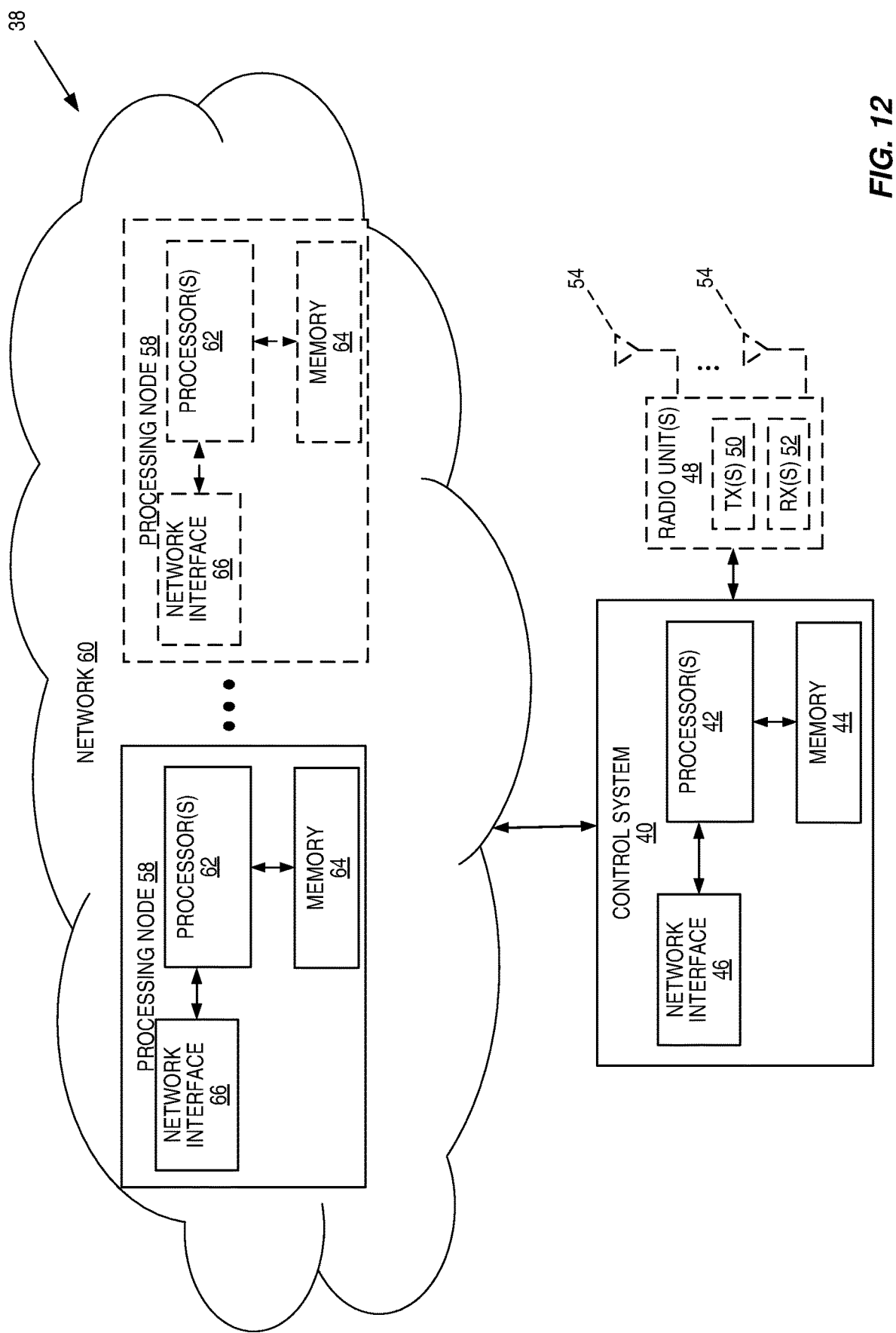

FIG. 12 is a schematic block diagram that illustrates a virtualized embodiment of the network node 38 according to some embodiments of the present disclosure. As used herein, a "virtualized" network node 38 is a network node 38 in which at least a portion of the functionality of the network node 38 is implemented as a virtual component (e.g., via a virtual machine(s) executing on a physical processing node(s) in a network(s)). As illustrated, the network node 38 optionally includes the control system 40, as described with respect to FIG. 11. In addition, if the network node 38 is a radio access node, the network node 38 also includes the one or more radio units 48, as described with respect to FIG. 10. The control system 40 (if present) is connected to one or more processing nodes 58 coupled to or included as part of a network(s) 60 via the network interface 46. Alternatively, if the control system 40 is not present, the one or more radio units 48 (if present) are connected to the one or more processing nodes 58 via a network interface(s). Alternatively, all of the functionality of the network node 38 described herein may be implemented in the processing nodes 58 (i.e., the network node 38 does not include the control system 40 or the radio unit(s) 48). Each processing node 58 includes one or more processors 62 (e.g., CPUs, ASICs, DSPs, FPGAs, and/or the like), memory 64, and a network interface 66.

In this example, functions of the network node 38 described herein are implemented at the one or more processing nodes 58 or distributed across the control system 40 (if present) and the one or more processing nodes 58 in any desired manner. In some particular embodiments, some or all of the functions of the network node 38 described herein are implemented as virtual components executed by one or more virtual machines implemented in a virtual environment(s) hosted by the processing node(s) 58. As will be appreciated by one of ordinary skill in the art, additional signaling or communication between the processing node(s) 58 and the control system 40 (if present) or alternatively the radio unit(s) 48 (if present) is used in order to carry out at least some of the desired functions. Notably, in some embodiments, the control system 40 may not be included, in which case the radio unit(s) 48 (if present) communicates directly with the processing node(s) 58 via an appropriate network interface(s).

In some particular embodiments, higher layer functionality (e.g., layer 3 and up and possibly some of layer 2 of the protocol stack) of the network node 38 may be implemented at the processing node(s) 58 as virtual components (i.e., implemented "in the cloud"), whereas lower layer functionality (e.g., layer 1 and possibly some of layer 2 of the protocol stack) may be implemented in the radio unit(s) 48 and possibly the control system 40.

In some embodiments, a computer program including instructions which, when executed by the one or more processors 42, 62, causes the one or more processors 42, 62 to carry out the functionality of the network node 38 or a processing node 58 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 64).

Channel Access

One embodiment provides teachings on channel access design on unlicensed carriers. 3GPP TS 36.213, Table 15.1.1-1 defines channel access priority classes 1 through 4 as shown below. Each channel access priority class is associated with a Maximum Channel Occupancy Time (MCOT) and range of allowed Contention Window (CW) sizes.

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In one aspect of this embodiment, if the network node (e.g., a NR-U gNB) 38 self-punctures eMBB data to transmit URLLC traffic, then the Contention Window Size (CWS) adjustment operation takes this into account to avoid unnecessary CWS doubling. More specifically, Hybrid Automatic Repeat Request (HARQ) Negative Acknowledgements (NACKs) from Physical Downlink Shared Channel (PDSCH) transmission(s) that were punctured by URLLC data are not included in the Downlink (DL) CWS adjustment operation of the network node 38.

In another aspect, a new channel access priority class, denoted as priority class 0, is defined for a Transmit Opportunity (TXOP) consisting of one or more symbols of URLLC-only data. Depending on whether the NR-U numerology is 15 Kilohertz (kHz), 30 kHz, or 60 kHz, two-symbol transmission requires approximately 142 Microseconds (μs), 83.3 μs, and 41.7 μs, respectively with normal cyclic prefix. An example Maximum Channel Occupancy Time (MCOT) duration of 0.15 ms therefore allows two-symbol URLLC transmission for all NR numerologies. If the network node 38 wants to send eMBB data after a priority class 0 transmission, it must go through a post-backoff procedure before starting the channel sensing procedure for the eMBB channel access priority class.

TABLE 2

| Priority class 0 for URLLC (new) | | | | | |
|---|---|---|---|---|---|
| Channel Access Priority Class (p) | $m_p$ | $CW_{min,p}$ | $CW_{max,p}$ | $T_{mcot,p}$ | allowed $CW_p$ sizes |
| 0 | 1 | 1 | 3 | 0.15 ms | {1, 3} |

HARQ Feedback

Another embodiment is related to HARQ feedback procedures.

In the first aspect, the network node 38 semi-statically configures parameters for Code Block Group (CBG)-level (multi-bit) HARQ feedback for TXOPs containing URLLC transmissions. If the group-common Physical Downlink Control Channel (PDCCH) in the TXOP preemptively indicates the presence of URLLC traffic in that TXOP, then the UE switches to CBG-level HARQ feedback for one or more PDSCH codewords in that TXOP.

In some special cases, a single UE 18 may receive transmissions of two traffic types, e.g., both eMBB and URLLC transmissions, from the network node 38. In the event that such a dual-class UE 18 receives DL transmissions of two traffic types, the UE may prioritize DL HARQ feedback for one of the transmission types over DL HARQ feedback for the other transmission type. For example, if a dual-class UE 18 receives DL URLLC data, the corresponding UE behavior may be to prioritize DL HARQ feedback for the URLLC PDSCH over any pending DL HARQ feedback for eMBB PDSCH. As another example, if a short Physical Uplink Control Channel (PUCCH) or long PUCCH opportunity is available in the TXOP to the UE 18, then the feedback of URLLC HARQ Acknowledgement (ACK)/NACK is prioritized.

In another aspect, separate HARQ process Identifiers (IDs) are configured for transmissions of different traffic types. For example, separate HARQ process IDs may be configured for URLLC and eMBB transmissions, on both the DL and Uplink (UL). In one embodiment, a UE 18 is not expected to receive UL grants for transmissions of both traffic types (e.g., URLLC and eMBB transmissions) in the same slot.

Resource Gaps and Switching

Yet another embodiment is related to network node indications for resource gaps and resource switching.

In one embodiment, control channel resources may be used to indicate symbol gaps in shared channel resources. In one embodiment, for example, group-common PDCCH carrying TXOP information or another PDCCH can be used to indicate Physical Uplink Shared Channel (PUSCH) symbol gaps to UEs 18 with scheduled UL transmissions of eMBB data. For example, a UE 18 with PUSCH transmission scheduled on X consecutive Orthogonal Frequency Division Multiplexing (OFDM) symbols in a slot, where the scheduling was performed using a UE-specific Downlink Control Information (DCI), can be instructed to puncture one or more of the X symbols on one or more of its allocated frequency resources or interlaces. These gaps can then be used for URLLC UL transmissions in the same slot.

In another aspect, UL frequency resources granted for a particular traffic type, e.g., eMBB UL transmissions, may be conditional on a second, trigger indication from the network node 38. In one embodiment, for example, if the second indication is present in the group-common PDCCH in the TXOP, then the UEs 18 proceed with the scheduled UL transmission; otherwise, if no trigger is received within a specific time window, the UL grant is deemed to have expired.

In another aspect, the network node 38 can indicate resource switching for control channel transmissions. As an example, in one embodiment, if short PUCCH and long PUCCH resources are shared for eMBB and URLLC HARQ feedback from multiple UEs 18, then the network node 38 can use common PDCCH signaling to indicate to eMBB UEs 18 that their allocated PUCCH opportunities need to be switched to URLLC UEs 18. Upon receiving such an indication, the eMBB UEs 18 refrain from transmitting HARQ feedback in the indicated PUCCH resources.

In another aspect, when the network node 38 transmits PDSCH carrying system information, e.g., Remaining Minimum System Information (RMSI), it can signal to the UE 18 that one or more symbols allocated for the system information in the slot will be punctured for URLLC transmissions (either UL or DL). If the network node 38 has knowledge of the puncturing of the system information before the start of the slot, the signaling can be done on either the group common PDCCH or as part of the DCI that schedules PDSCH carrying the system information. If the network node 38 does not know if there will be a URLLC transmission (with associated puncturing of the system information) before the start of the slot, one option is to use the PDCCH of a mini-slot located within the slot carrying the system information. Another option is that the network node 38 signals, to the UE 18, that one or more symbols (which can either be a priori known or semi-statically configured) might be punctured. The UE 18 will then try to decode PDSCH carrying the system information hypothesizing both puncturing and no puncturing.

Figure 13:
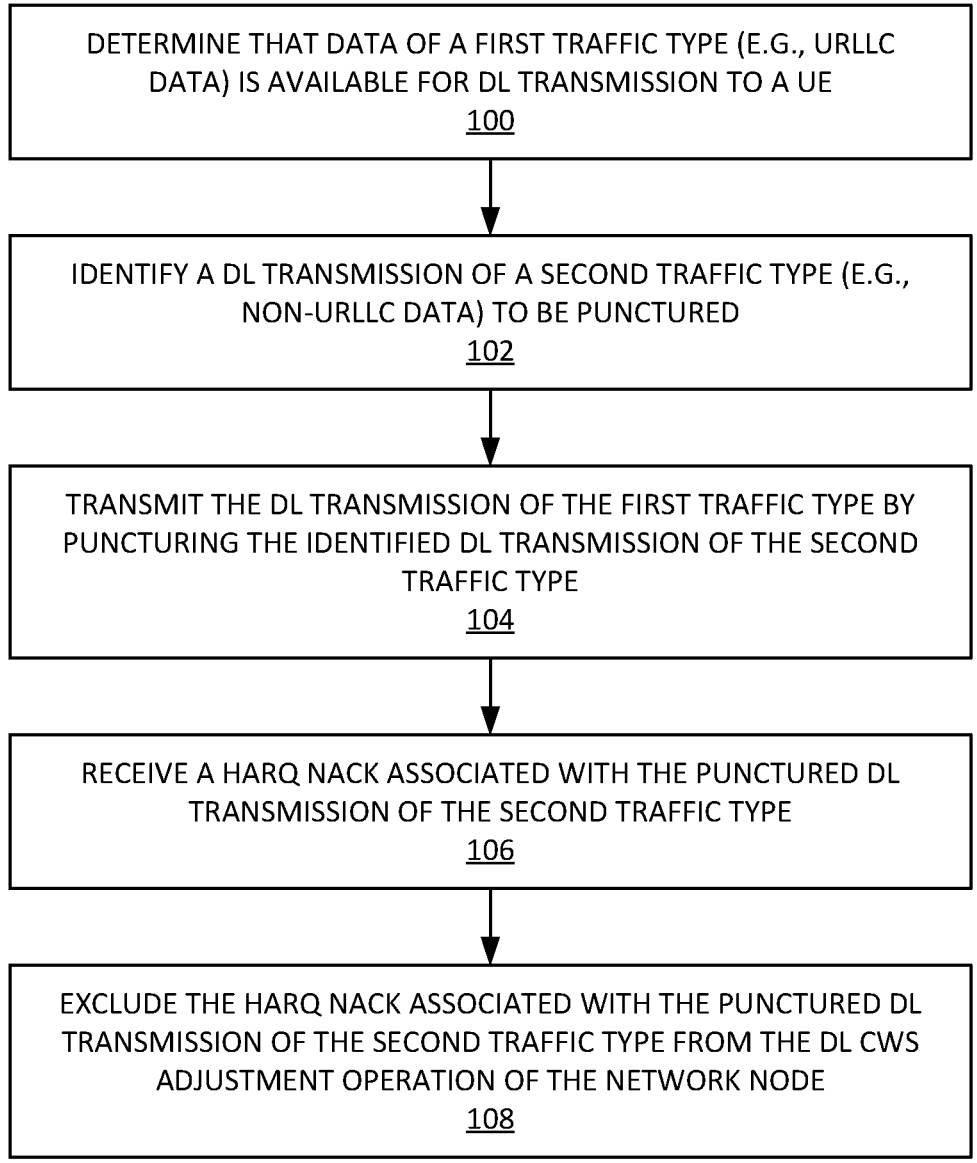
FIG. 13 through 17 are flow charts illustrating the operation of a NR Base Station (gNB) or other network node according to some embodiments of the present disclosure.

FIG. 13 is a flow chat illustrating the operation of a network node 38 (e.g., a gNB) according to an embodiment of the present disclosure. In the embodiment illustrated in FIG. 13, the operation includes: determining that data of a first traffic type, e.g., URLLC data, is available for DL transmission to a UE 18 (step 100); identifying a DL transmission of a second traffic type, e.g., a non-URLLC DL transmission, to be punctured (step 102); transmitting the DL transmission of the first traffic type by puncturing the identified DL transmission of the second traffic type (step 104); receiving a HARQ NACK associated with the punctured DL transmission of the second traffic type (step 106); and excluding the HARQ NACK associated with the punctured DL transmission of the second traffic type from the DL CWS adjustment operation of the network node 38 (step 108).

Figure 14:
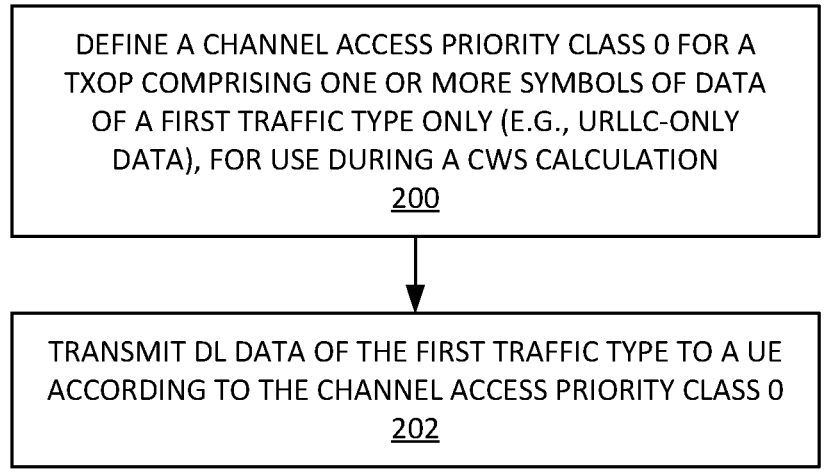

FIG. 14 is a flow chart illustrating the operation of a network node 38 (e.g., a gNB) according to another embodiment of the present disclosure. In the embodiment illustrated in FIG. 14, the operation includes: defining a channel access priority class 0 for a TXOP comprising one or more symbols of data of a first traffic type only (e.g., URLLC-only data), for use during a CWS calculation (step 200); and transmitting the data of the first traffic type only to a UE 18 according to the channel access priority class 0 (step 202).

Figure 15:
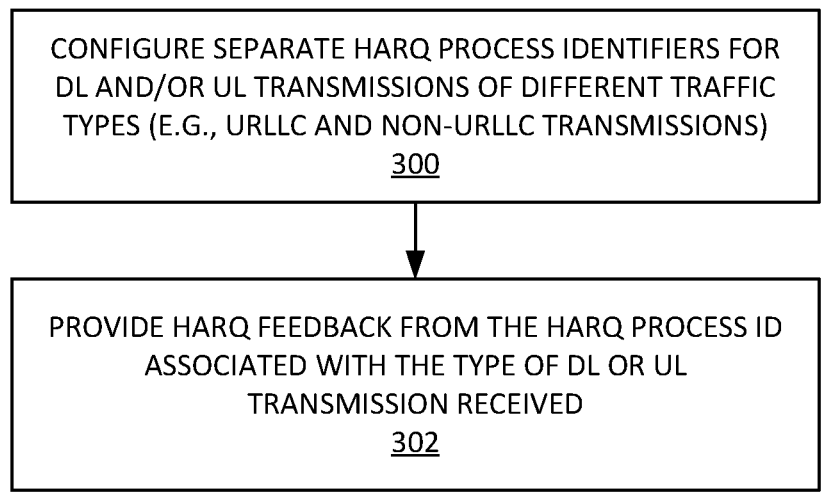

FIG. 15 is a flow chart illustrating the operation of a network node 38 (e.g., a gNB) according to another embodiment of the present disclosure. In the embodiment illustrated in FIG. 15, the operation includes: configuring separate HARQ process IDs for UL and DL transmissions of different traffic types, e.g., URLLC and non-URLLC DL and/or UL transmissions (step 300); and providing HARQ feedback from the HARQ process ID associated with the type of DL or UL transmission received (step 302).

Figure 16:
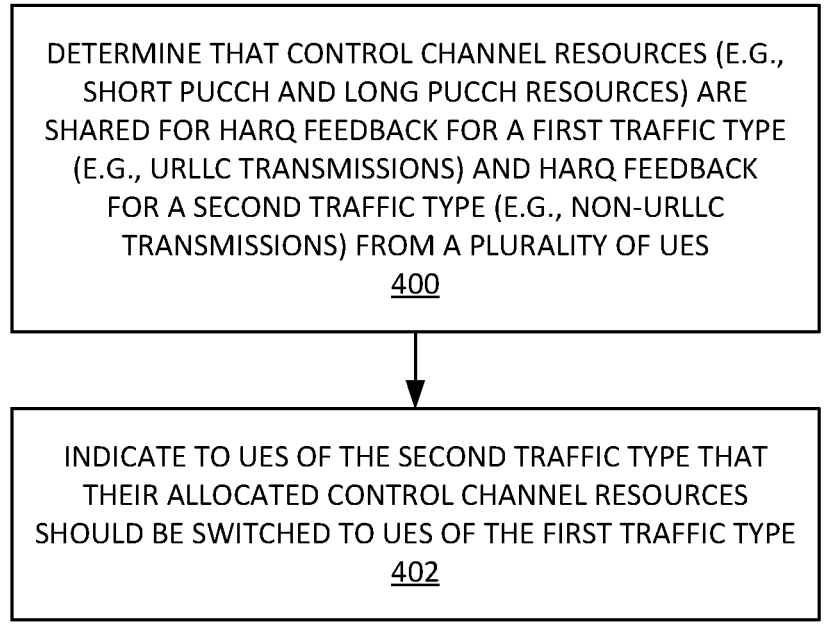

FIG. 16 is a flow chart illustrating the operation of a network node 38 (e.g., a gNB) according to another embodiment of the present disclosure. In the embodiment illustrated in FIG. 16, the operation includes: determining that control channel resources (e.g., short PUCCH and long PUCCH resources) are shared for HARQ feedback for transmissions of a first traffic type and HARQ feedback for transmissions of a second traffic type (e.g., URLLC and non-URLLC transmissions, respectively) from a plurality of UEs 18 (step 400); and indicating to UEs 18 of the second traffic type that their allocated control channel resources should be switched to UEs 18 of the first traffic type (step 402).

Figure 17:
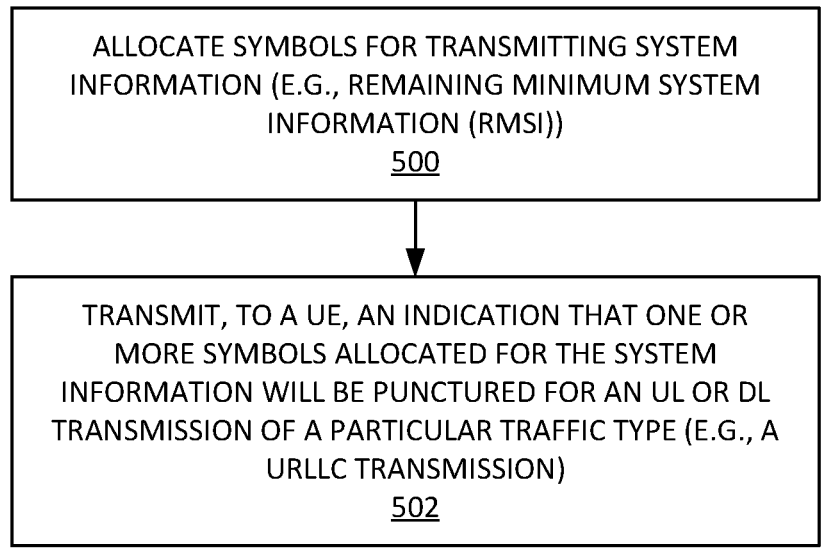

FIG. 17 is a flow chart illustrating the operation of a network node 38 (e.g., a gNB) according to another embodiment of the present disclosure. In the embodiment illustrated in FIG. 17, the operation includes: allocating symbols for transmitting system information, e.g., RMSI (step 500); and transmitting, to a UE 18, an indication that one or more symbols allocated for the system information will be punctured for UL or DL transmission of a particular traffic type, e.g., URLLC transmissions (step 502).

Figure 18:
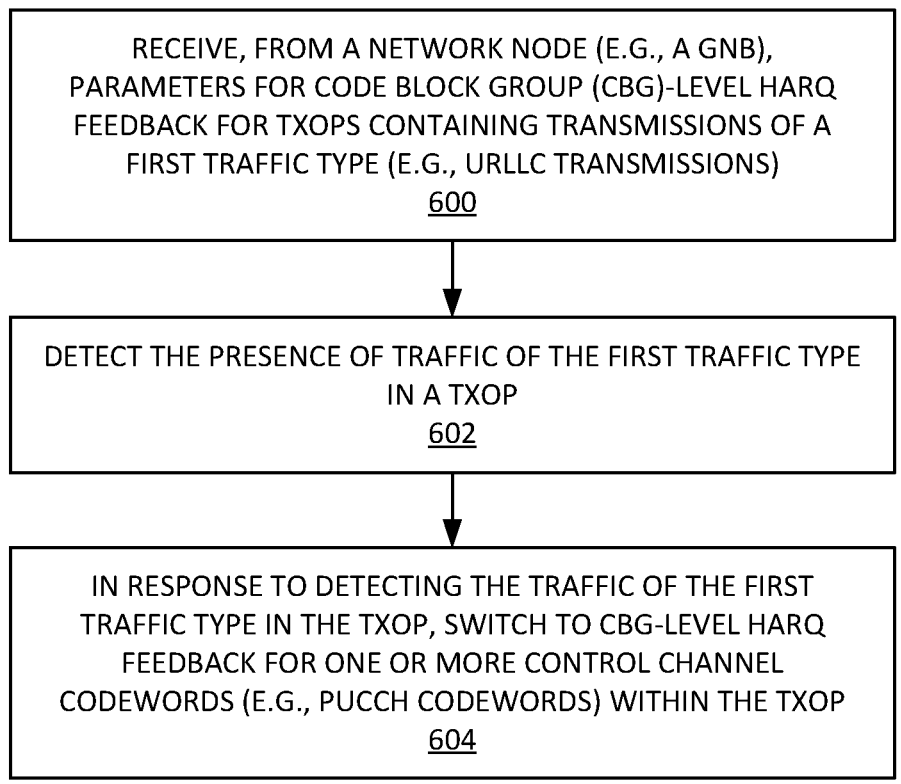
FIGS. 18 through 24 are flow charts illustrating the operation of a UE or other wireless device according to some embodiments of the present disclosure.

FIG. 18 is a flow chart illustrating the operation of a UE 18 or other wireless device according to an embodiment of the present disclosure. In the embodiment illustrated in FIG. 18, the operation includes: receiving, from the network node 38 (e.g., a gNB), parameters for CBG-level HARQ feedback for TXOPs containing transmissions of a first traffic type, e.g., URLLC (step 600); detecting the presence of traffic of the first traffic type in a TXOP (step 602); and, in response to detecting the traffic of the first traffic type in the TXOP, switching to CBG-level HARQ feedback for one or more control channel codewords (e.g., PDCCH codewords) within the TXOP (step 604).

Figure 19:
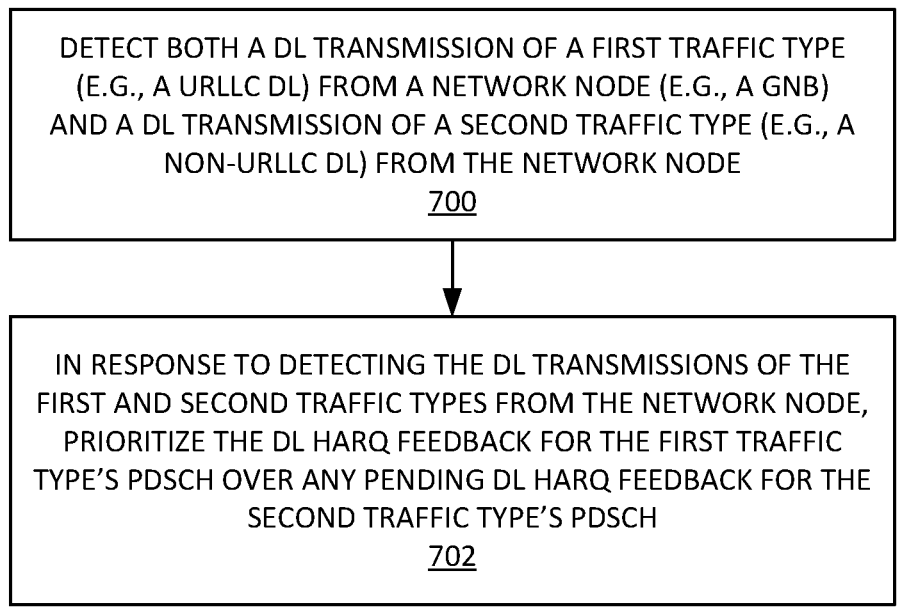

FIG. 19 is a flow chart illustrating the operation of a UE 18 or other wireless device according to an embodiment of the present disclosure. In the embodiment illustrated in FIG. 19, the operation includes: detecting both a DL transmission of a first traffic type (e.g., URLLC) from the network node 38 (e.g., a gNB) and a DL transmission of a second traffic type (e.g., non-URLLC) from the network node 38 (step 700); and, in response to detecting the DL transmissions of the first and second traffic types from the network node 38, prioritizing the DL HARQ feedback for the first traffic type's PDSCH over any pending DL HARQ feedback for the second traffic type's PDSCH (step 702).

Figure 20:
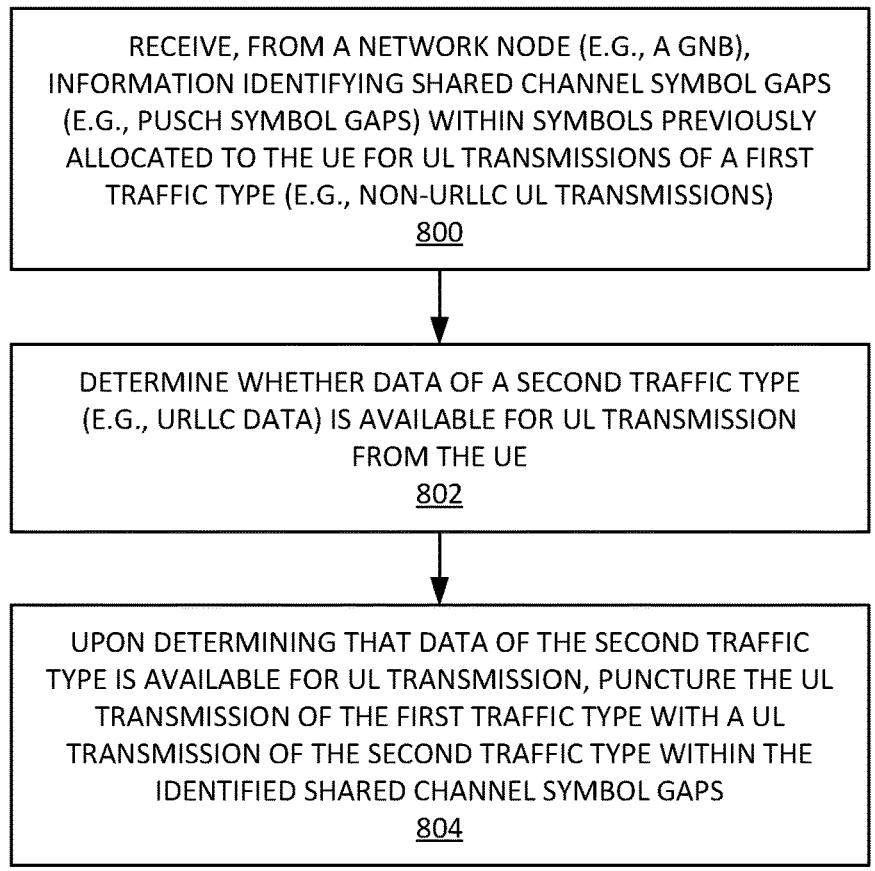

FIG. 20 is a flow chart illustrating the operation of a UE 18 or other wireless device according to an embodiment of the present disclosure. In the embodiment illustrated in FIG. 20, the operation includes: receiving, from a network node 38 (e.g., a gNB), information identifying shared channel symbol gaps (e.g., PUSCH symbol gaps) within symbols previously allocated to the UE 18 for UL transmissions of a first traffic type (e.g., non-URLLC transmissions) (step 800); determining whether data of a second traffic type (e.g., URLLC data) is available for UL transmission from the UE 18 (step 802); and, upon determining that the data of the second traffic type is available for UL transmission, puncturing the UL transmission of the first traffic type with an UL transmission of the second traffic type within the identified shared channel symbol gaps (step 804).

Figure 21:
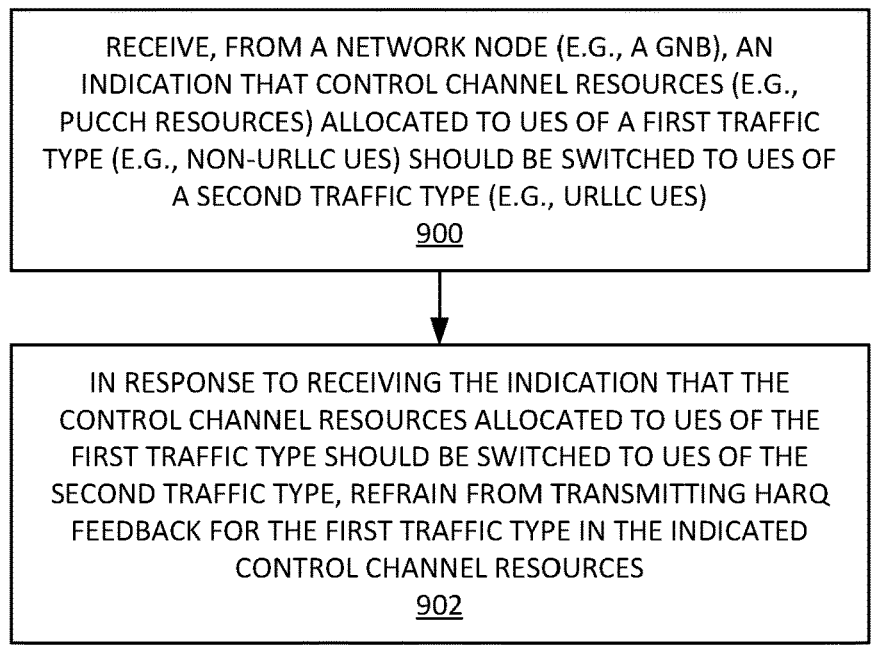

FIG. 21 is a flow chart illustrating the operation of a UE 18 or other wireless device according to an embodiment of the present disclosure. In the embodiment illustrated in FIG.

21, the operation includes: receiving, from a network node 38 (e.g., a gNB), an indication that control channel resources (e.g., PUCCH resources) allocated to UEs 18 of a first traffic type (e.g., non-URLCC UEs) should be switched to UEs 18 of a second traffic type (e.g., URLLC UEs) (step 900); and, in response to receiving the indication that control channel resources allocated to UEs 18 of the first traffic type should be switched to UEs 18 of the second traffic type, refraining from transmitting HARQ feedback for the first traffic type in the indicated control channel resources (step 902).

Figure 1:
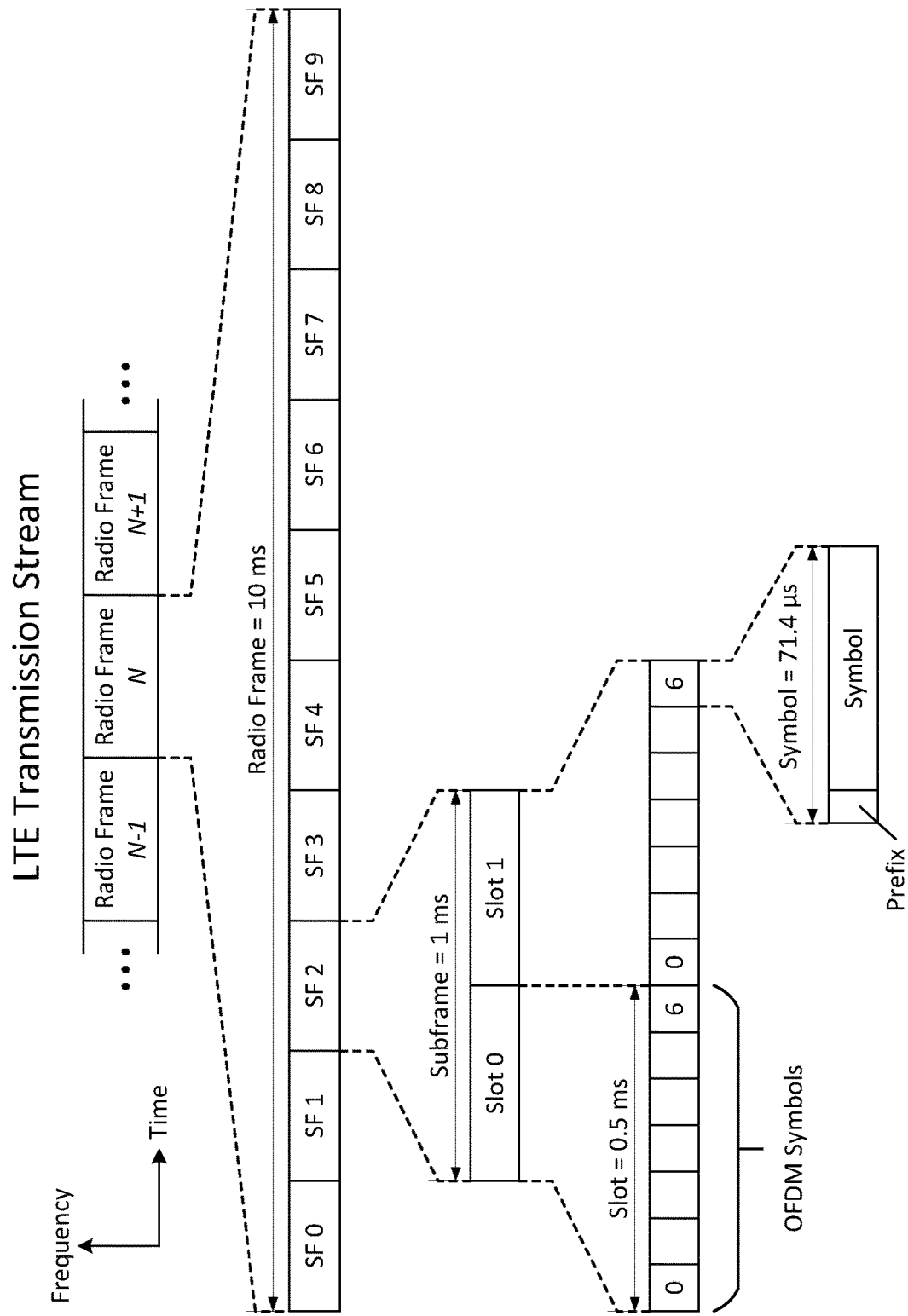
FIG. 1 illustrates the structure of a conventional Long Term Evolution (LTE) transmission stream.
Figure 2:
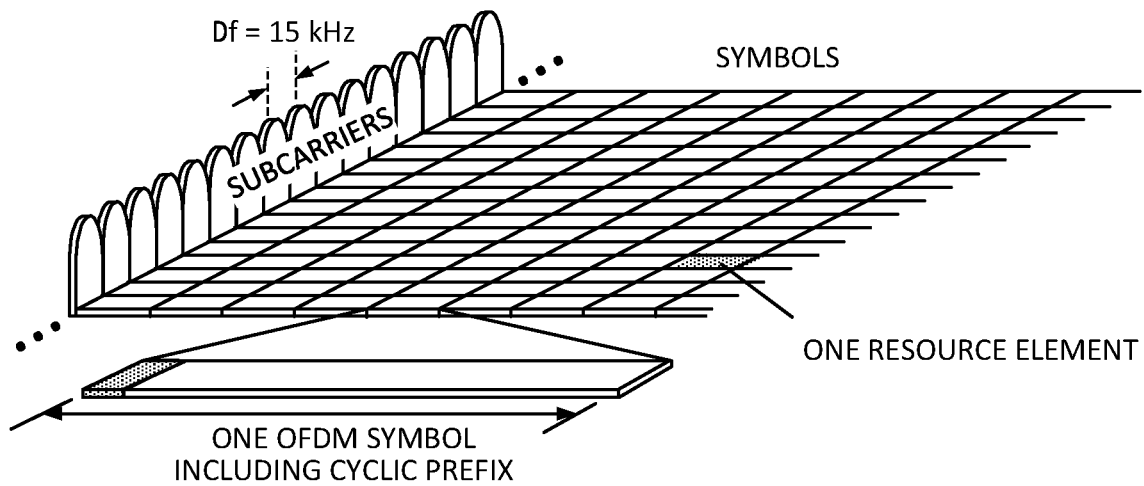
FIG. 2 illustrates an LTE resource grid.
Figure 3:
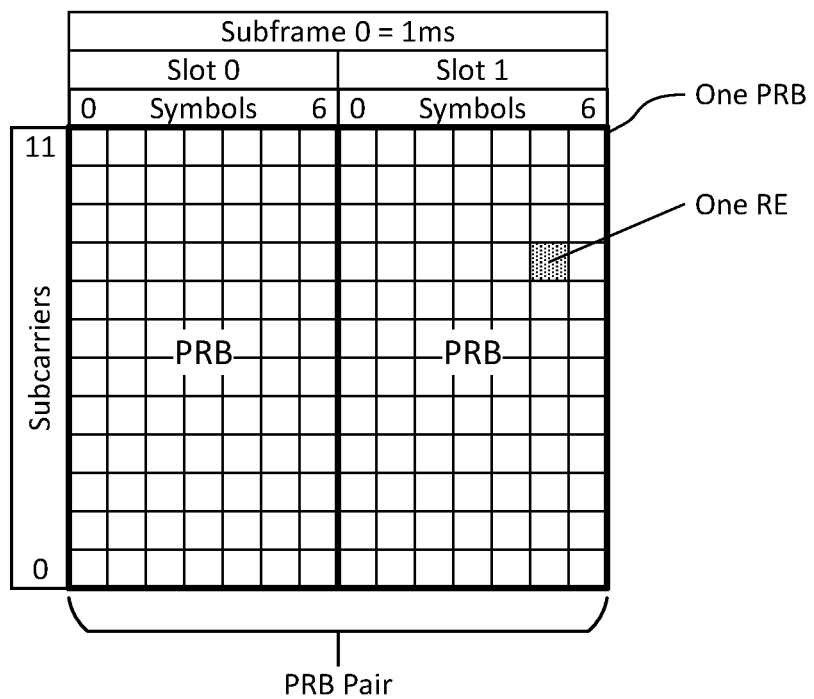
FIG. 3 illustrates an LTE Physical Resource Block (PRB)
Figure 4:
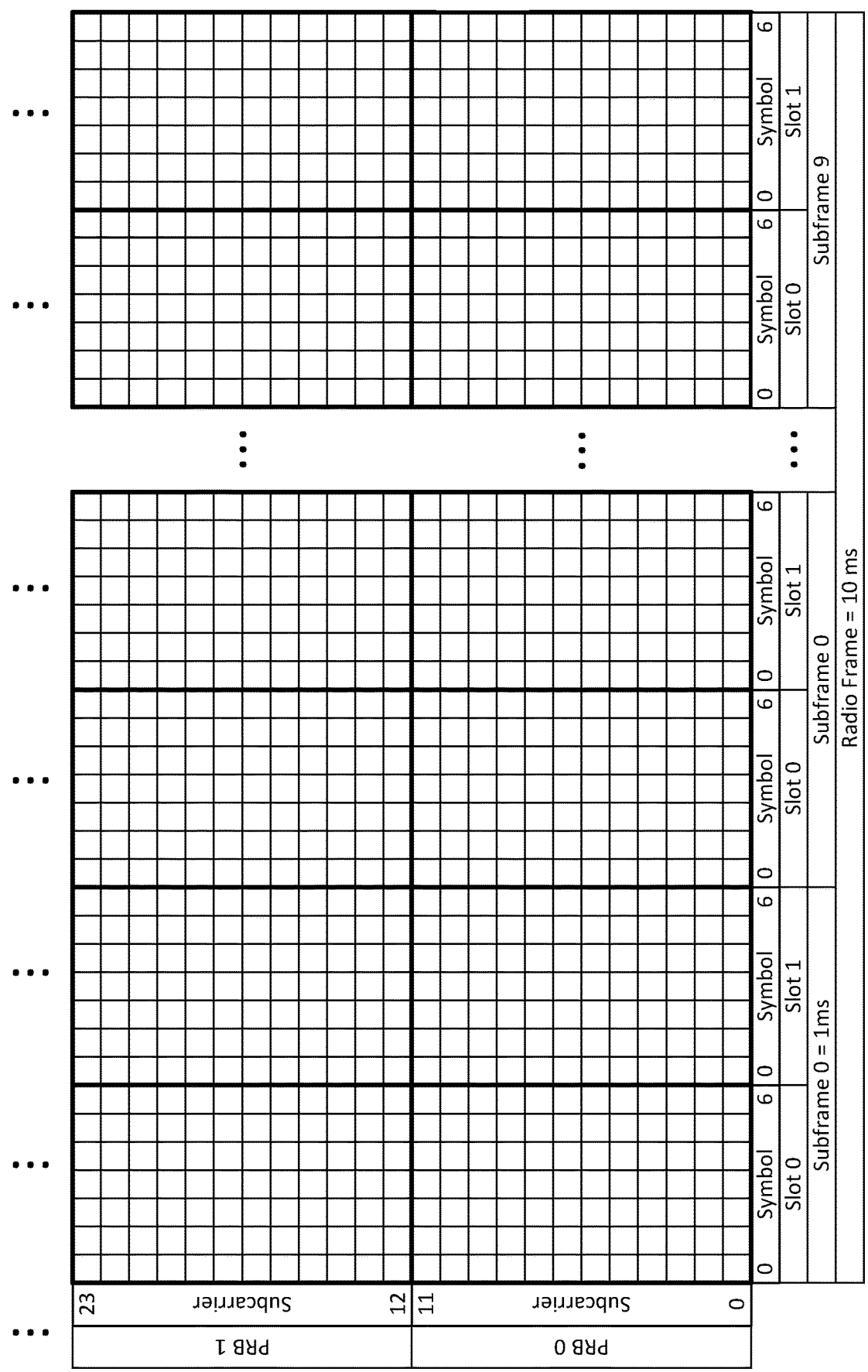
FIG. 4 illustrates in more detail an LTE resource grid.
Figure 5:
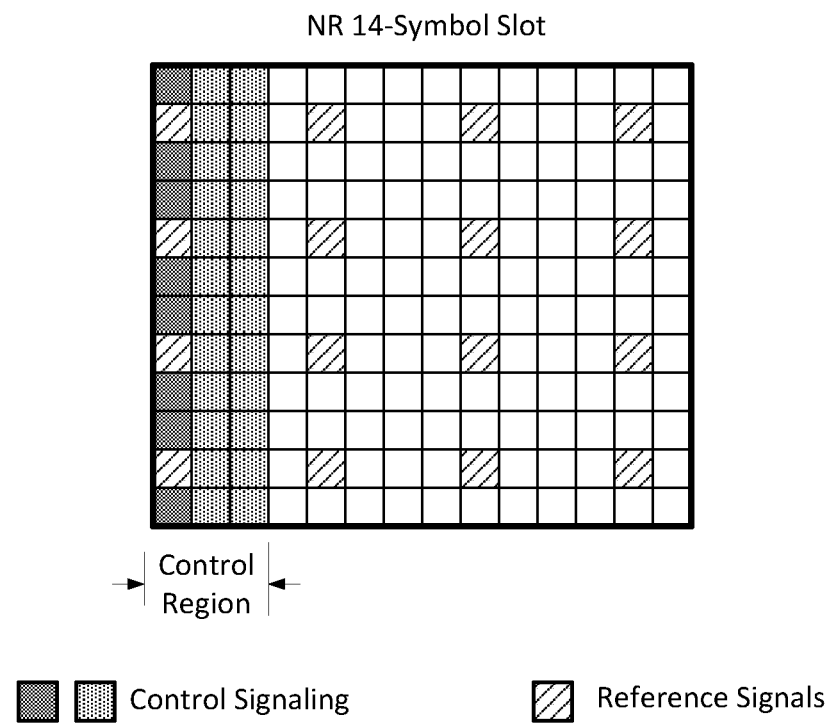
FIG. 5 illustrates a 14-symbol resource allocation slot in New Radio (NR)
Figure 6:
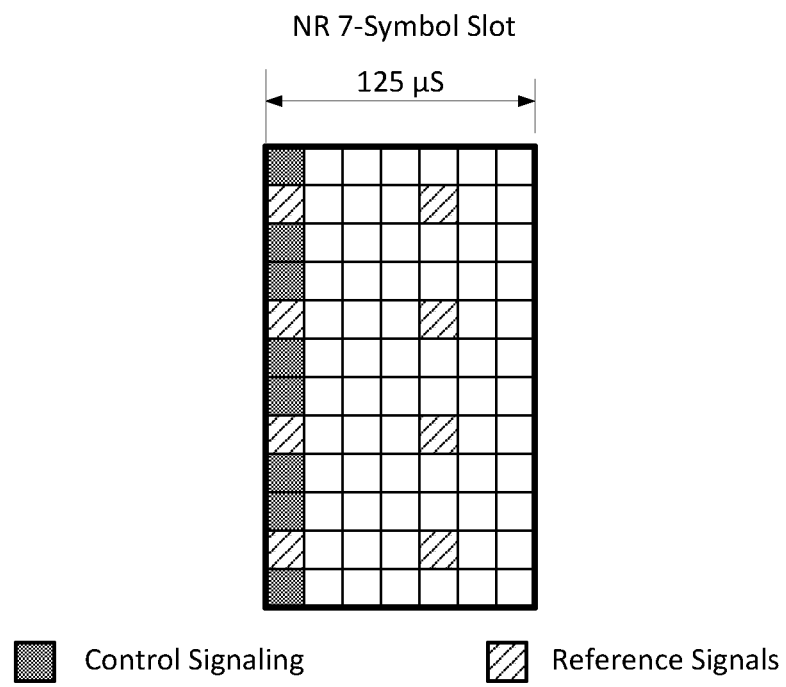
FIG. 6 illustrates a 7-symbol resource allocation slot in NR.
Figure 7:
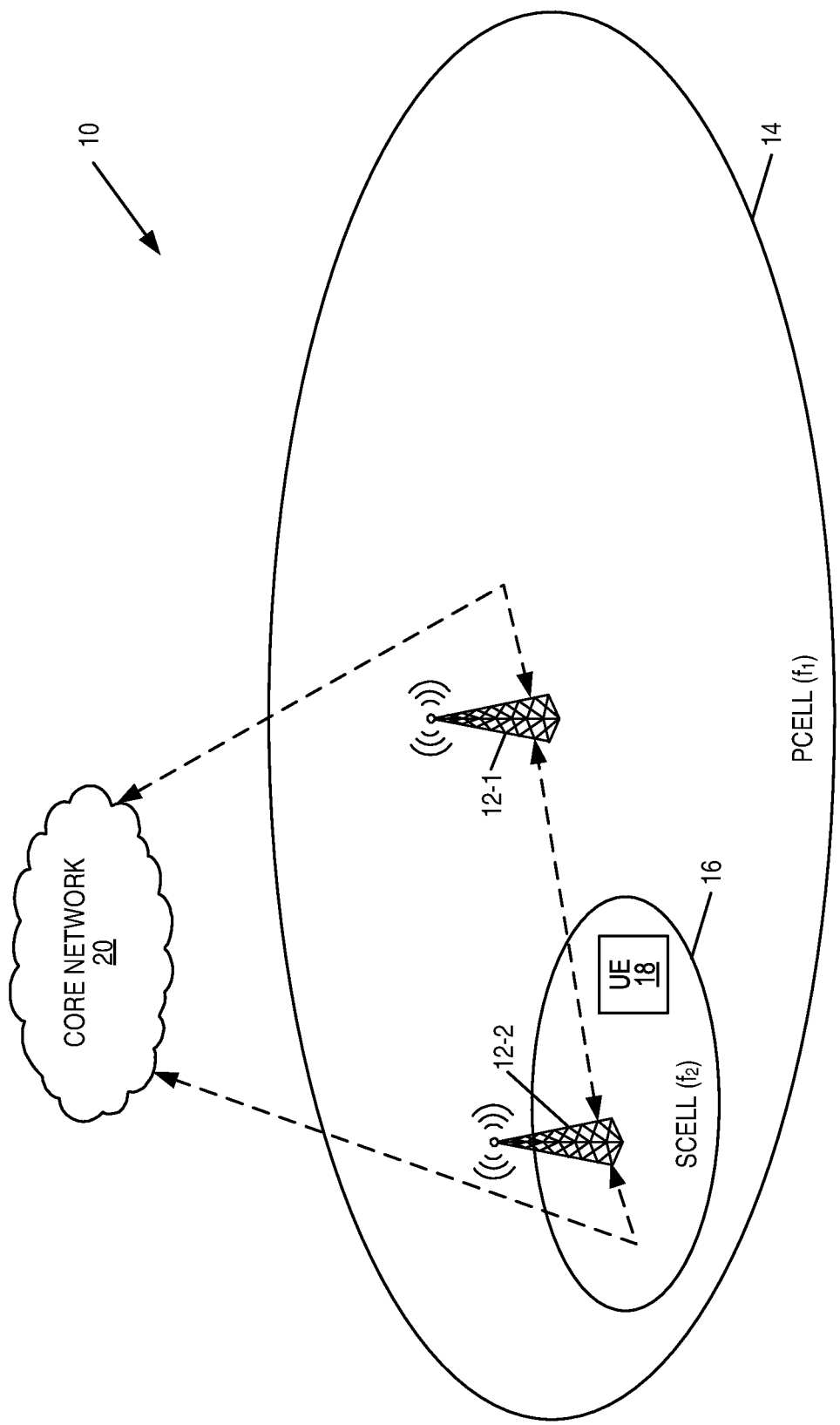
FIG. 7 illustrates a telecommunication network having primary and secondary cells.
Figure 22:
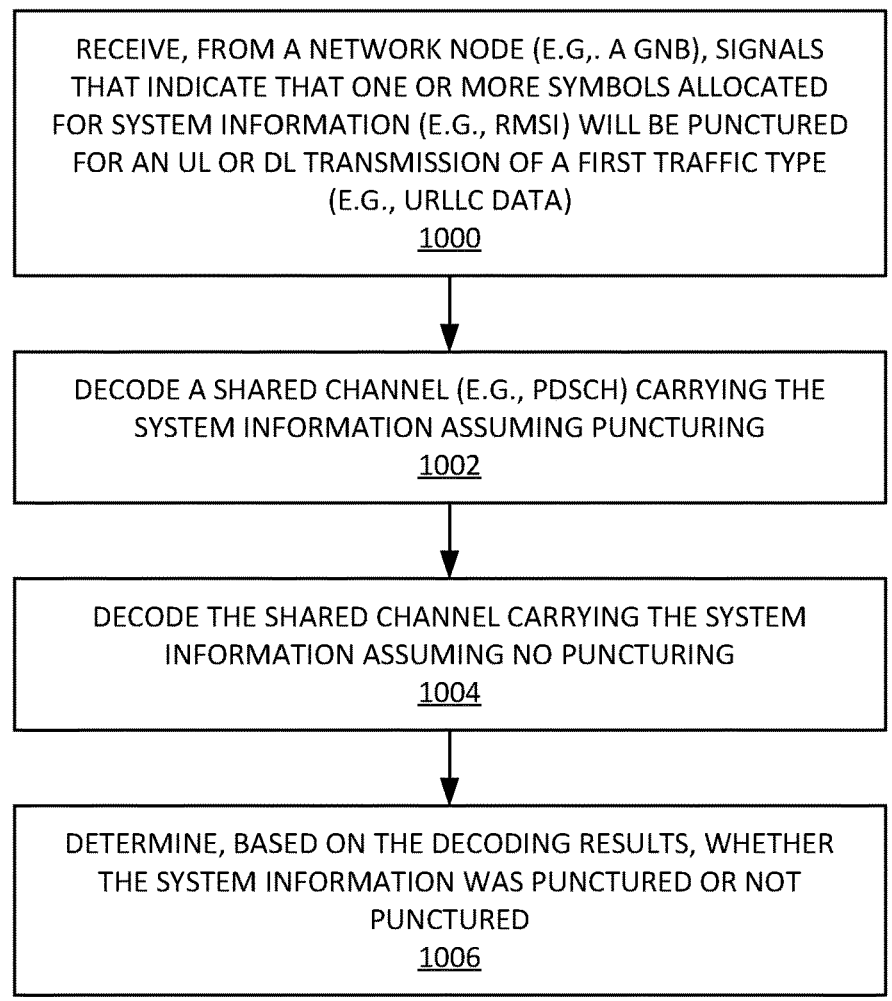

FIG. 22 is a flow chart illustrating the operation of a UE 18 or other wireless device according to an embodiment of the present disclosure. In the embodiment illustrated in FIG. 2, the operation includes: receiving, from a network node 38 (e.g., a gNB), signals that indicate that one or more symbols allocated for system information (e.g., RMSI) will be punctured for an UL or DL transmission of a first traffic type (e.g., a URLLC transmission) (step 1000); decoding a shared channel (e.g., PDSCH) carrying system information (e.g., RMSI) assuming puncturing (step 1002); decoding the shared channel carrying the system information assuming no puncturing (step 1004); and determining, based on the decoding results, whether the system information was punctured or not punctured (step 1006).

Figure 23:
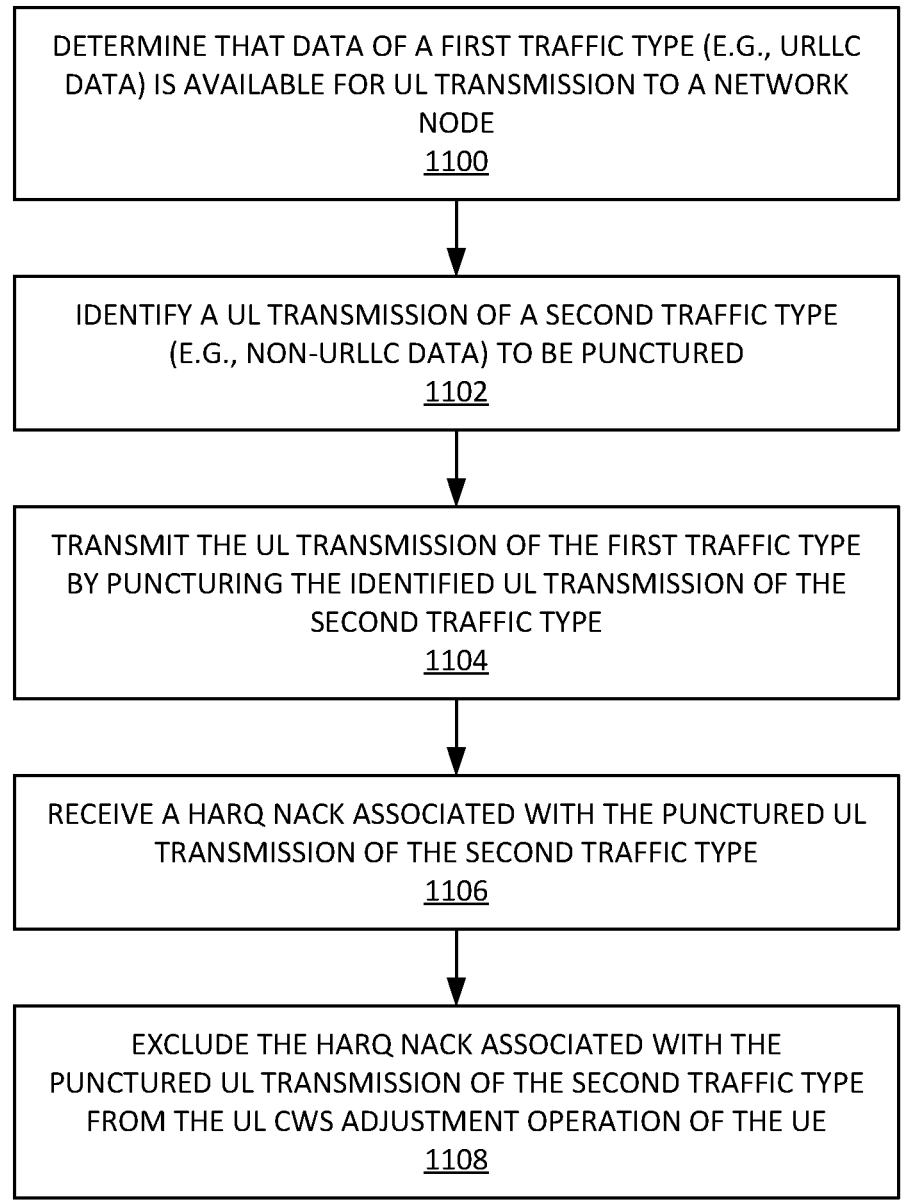

FIG. 23 is a flow chat illustrating the operation of a UE 18 or other wireless device according to an embodiment of the present disclosure. In the embodiment illustrated in FIG. 23, the operation includes: determining that data of a first traffic type, e.g., URLLC data, is available for UL transmission to a network node 38 (e.g., a gNB) (step 1100); identifying a transmission of a second traffic type, e.g., a non-URLLC DL transmission, to be punctured (step 1102); transmitting the UL transmission of the first traffic type by puncturing the identified UL transmission of the second traffic type (step 1104); receiving a HARQ NACK associated with the punctured UL transmission of the second traffic type (step 1106); and excluding the HARQ NACK associated with the punctured UL transmission of the second traffic type from the UL CWS adjustment operation of the UE 18 (step 1108).

Figure 24:
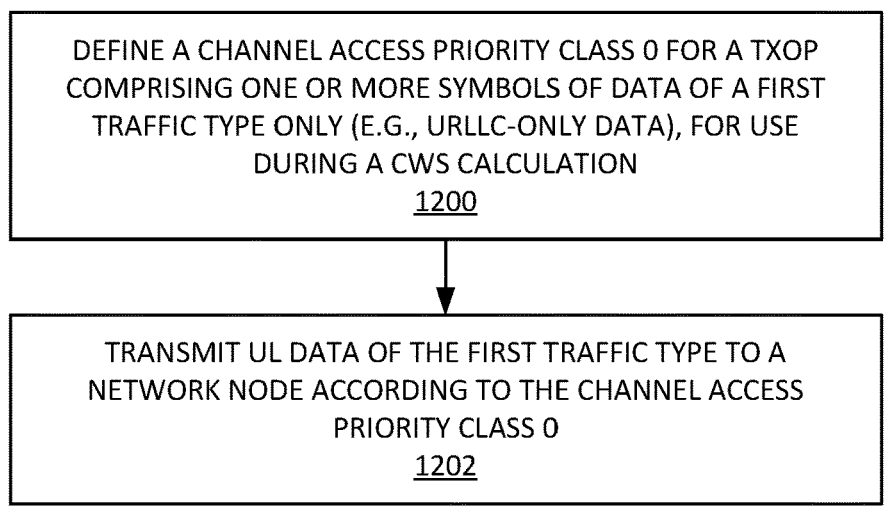

FIG. 24 is a flow chart illustrating the operation of a UE 18 or other wireless device according to another embodiment of the present disclosure. In the embodiment illustrated in FIG. 14, the operation includes: defining a channel access priority class 0 for a TXOP comprising one or more symbols of data of a first traffic type only (e.g., URLLC-only data), for use during a CWS calculation (step 1200); and transmitting the data of the first traffic type only to a network node 38 (e.g., a gNB) according to the channel access priority class 0 (step 1202).

Embodiments

While not being limited thereto, some example embodiments of the present disclosure are provided below.

1. A method of operation of a network node, the method comprising: determining that data is available for Downlink (DL) transmission of a first traffic type to a User Equipment (UE); identifying a DL transmission of a second traffic type to be punctured; transmitting the DL transmission of the first traffic type by puncturing the identified DL transmission of the second traffic type; receiving a Hybrid Automatic Repeat Request (HARQ) Negative Acknowledgement (NACK) associated with the punctured DL transmission of the second traffic type; and excluding the HARQ NACK associated with the punctured DL transmission of the second traffic type from a DL Contention Window Size (CWS) adjustment operation of the network node.

2. The method of embodiment 1 wherein the network node comprises a Fifth Generation (5G) New Radio (NR) Base Station (gNB).

3. The method of embodiment 1 or 2 wherein the DL transmission of the first traffic type comprises an Ultra-Reliable Low Latency Communications (URLLC) transmission.

4. The method of any of embodiments 1-3 wherein the DL transmission of the second traffic type comprises a non-URLLC transmission.

5. The method of embodiment 4 wherein the non-URLLC transmission comprises an Enhanced Mobile Broadband (eMBB) transmission.

6. A method of operation of a network node, the method comprising: defining a channel access priority class 0 for a Transmit Opportunity (TXOP) comprising one or more symbols of data of a first traffic type only; and transmitting DL data of the first traffic type only to a UE according to the channel access priority class 0.

7. The method of embodiment 6 wherein the data of the first traffic type comprises URLCC data only.

8. The method of embodiment 6 or 7 wherein the network node comprises a 5G NR Base Station (gNB).

9. The method of any of embodiments 6-8, further comprising: determining that data is available for a DL transmission of a second traffic type to the UE after the channel access priority class 0 transmission; and in response to determining that the data is available for the DL transmission of the second traffic type to the UE after the channel access priority class 0 transmission, performing a post-backoff procedure prior to starting a channel sensing procedure for the DL transmission of the second traffic type.

10. The method of any of embodiments 6-9 wherein the DL transmission of the second traffic type comprises a non-URLLC transmission.

11. The method of embodiment 10 wherein the non-URLLC transmission comprises an eMBB transmission.

12. A method of operation of a network node for operating in a telecommunication network, the method comprising: configuring separate HARQ process identifiers (IDs), for DL and Uplink (UL) transmissions of a first traffic type and of a second traffic type; and providing HARQ feedback from the HARQ process ID associated with a traffic type of DL or UL transmission received.

13. The method of embodiment 12 wherein the UL and DL transmissions of the first traffic type comprise URLCC transmissions.

14. The method of embodiment 12 or 13 wherein the UL and DL transmissions of the second traffic type comprise non-URLLC transmissions.

15. The method of embodiment 14 wherein the non-URLLC transmissions comprise eMBB transmissions.

16. The method of any of embodiments 12-15 wherein the network node comprises a gNB.

17. The method of embodiment 16 wherein the gNB does not issue UL grants for both the UL and DL transmissions of the first traffic type and the UL and DL transmissions of the second traffic type in a same slot.

18. The method of any of embodiments 12-17 wherein the network node comprises a UE.

19. A method of operation of a network node, the method comprising: determining that short Physical Uplink Control Channel (PUCCH), and long PUCCH resources are shared for HARQ feedback for transmissions of a first traffic type and HARQ feedback for transmissions of a second traffic type from a plurality of UEs; and indicating to UEs transmitting the second traffic type that their allocated PUCCH resources should be switched to UEs transmitting the first traffic type.

20. The method of embodiment 19 wherein the network node comprises a gNB.

21. The method of embodiment 19 or 20 wherein the transmissions of the first traffic type comprise URLCC transmissions.

22. The method of any of embodiments 19-21 wherein the transmissions of the second traffic type comprise non-URLLC transmissions.

23. The method of embodiment 22 wherein the non-URLLC transmissions comprise eMBB transmissions.

24. A method of operation of a network node, the method comprising: allocating symbols for transmitting system information; transmitting, to a UE an indication that one or more symbols allocated for the system information will be punctured for an URLCC UL or DL transmission.

25. The method of embodiment 24 wherein the network node comprises a gNB.

26. The method of embodiment 24 or 25 wherein the network node has knowledge of the puncturing of the system information before the start of a slot and wherein transmitting the indication that one or more symbols allocated for the system information will be punctured for the URLCC UL or DL transmission comprises transmitting the indication via a group-common Physical Downlink Control Channel (PDCCH), or as part of a Downlink Control Information (DCI) that schedules Physical Downlink Shared Channel (PDSCH), carrying the system information.

27. The method of any of embodiments 24-26 wherein the network node does not have knowledge of the puncturing of the system information before the start of a slot and wherein transmitting the indication that one or more symbols allocated for the system information will be punctured for the URLCC UL or DL transmission comprises using a PDCCH of a mini-slot located within the slot carrying the system information.

28. The method of any of embodiments 24-27 wherein the system information comprises Remaining Minimum System Information (RMSI).

29. A method of operation of a UE for operating in a telecommunication network, the method comprising: receiving, from a network node, parameters for Code Block Group (CBG)-level HARQ feedback for TXOPs, containing transmissions of a first traffic type; detecting the presence of the transmissions of the first traffic type in a TXOP; and in response to detecting the transmissions of the first traffic type in the TXOP, switching to CBG-level HARQ feedback.

30. The method of embodiment 29 wherein receiving from the network node comprises receiving from a gNB.

31. The method of embodiment 29 or 30 wherein switching to CBG-level HARQ feedback comprises switching to CBG-level HARQ feedback for one or more PDSCH, codewords within the TXOP.

32. The method of any of embodiments 29-31 wherein detecting the presence of the transmissions of the first traffic type comprises detecting the presence of URLCC traffic.

33. The method of embodiment 32 wherein detecting the presence of URLLC traffic in the TXOP comprises detecting that a group-common PDCCH, indicates the presence of the URLLC traffic in the TXOP.

34. A method of operation of a UE for operating in a telecommunication network, the method comprising: detecting both a DL transmission of a first traffic type from a network node and a DL transmission of a second traffic type from the network node; and in response to detecting the DL transmissions of the first and second traffic types from the network node, prioritizing DL HARQ feedback for a PDSCH DL transmission of the first traffic type over any pending DL HARQ feedback for a PDSCH DL transmission of the second traffic type.

35. The method of embodiment 34 wherein detecting the DL transmissions from the network node comprises detecting the DL transmissions from a gNB.

36. The method of embodiment 34 or 35 wherein the DL transmission of the first traffic type comprises an URLCC transmission.

37. The method of any of embodiments 34-36 wherein the DL transmission of the second traffic type comprises a non-URLLC transmission.

38. The method of embodiment 37 wherein the non-URLLC transmission comprises an eMBB transmission.

39. A method of operation of a UE for operating in a telecommunication network, the method comprising: receiving, from a network node, information identifying symbol gaps within symbols previously allocated to the UE for an UL transmission of a first traffic type; determining whether data is available for an UL transmission of a second traffic type from the UE; and upon determining that the data is available for the UL transmission of the second traffic type, puncturing the UL transmission of the first traffic type with the UL transmission of the second traffic type within the identified symbol gaps.

40. The method of embodiment 39 wherein the symbol gaps comprise PUSCH, symbol gaps.

41. The method of embodiment 39 or 40 wherein receiving from the network node comprises receiving from a gNB.

42. The method of any of embodiments 39-41 wherein the UL transmission of the second traffic type comprises an URLCC transmission.

43. The method of any of embodiments 39-42 wherein the UL transmission of the first traffic type comprises a non-URLLC transmission.

44. The method of embodiment 43 wherein the non-URLLC transmission comprises an eMBB transmission.

45. The method of any of embodiments 39-44 wherein the UL transmission of the second traffic type is transmitted within a same slot.

46. The method of any of embodiments 39-45 wherein receiving the information identifying the symbol gaps comprises receiving information identifying the PUSCH symbol gaps.

47. The method of any of embodiments 39-46 wherein receiving the information identifying the PUSCH symbol gaps comprises receiving information via a PDCCH.

48. The method of embodiment 47 wherein receiving information via the PDCCH comprises receiving information via a group-common PDCCH carrying TXOP information.

49. The method of any of embodiments 39-48 wherein the symbols previously allocated to the UE for the UL transmission of the first traffic type were scheduled using UE-specific DCI.

50. The method of any of embodiments 39-49 wherein the information identifying the symbol gaps within the symbols previously allocated to the UE for the UL transmission of the first traffic type identifies symbols on one or more of allocated frequency resources and/or interlaces.

51. The method of any of embodiments 39-50 wherein a grant of UL frequency resources granted for the UL transmission of the first traffic type is conditional on an additional trigger indication from the network node.

52. The method of any of embodiments 39-51 wherein an additional trigger indication comprises an indication present within the group-common PDCCH in the TXOP.

53. The method of any of embodiments 39-52 wherein, if the additional trigger indication is present within the group-common PDCCH in the TXOP, then the UE will proceed with the scheduled UL transmission of the first traffic type; otherwise, the UE will consider a UL grant to be expired.

54. A method of operation of a UE for operating in a telecommunication network, the method comprising: receiving, from a network node, an indication that control channel resources allocated to UEs transmitting a first traffic type should be switched to UEs transmitting a second traffic type; and in response to receiving the indication that the control channel resources allocated to the UEs transmitting the first traffic type should be switched to the UEs transmitting the second traffic type, refraining from transmitting HARQ feedback for transmissions of the first traffic type in the indicated control channel resources.

55. The method of embodiment 54 wherein the network node comprises a gNB.

56. The method of embodiment 54 or 55 wherein the control channel resources comprise PUCCH, resources.

57. The method of any of embodiments 54-56 wherein the second traffic type comprises an URLLC, transmission.

58. The method of any of embodiments 54-57 wherein the first traffic type comprises a non-URLLC transmission.

59. The method of any of embodiments 54-58 wherein the non-URLLC transmission comprises an eMBB transmission.

60. A method of operation of a UE for operating in a telecommunication network, the method comprising: receiving, from a network node, signals that indicate that one or more symbols allocated for system information will be punctured for an URLLC, UL or DL transmission; decoding a PDSCH, carrying the system information assuming puncturing; decoding the PDSCH carrying the system information assuming no puncturing; and determining, based on decoding results, whether the system information was punctured or not punctured.

61. The method of embodiment 60 wherein the system information comprises Remaining Minimum System Information (RMSI).

62. A network node comprising: one or more processors; and memory comprising instructions executable by the one or more processors whereby the network node is adapted to: determine that data is available for a DL transmission of a first traffic type to a UE; identify a DL transmission of a second traffic type to be punctured; transmit the DL transmission of the first traffic type by puncturing the identified DL transmission of the second traffic type; receive a HARQ NACK associated with the punctured DL transmission of the second traffic type; and exclude the HARQ NACK associated with the punctured DL transmission of the second traffic type from a DL CWS adjustment operation of the network node.

63. The network node of embodiment 62 wherein the network node if further adapted to operate according to the method of any one of embodiments 2-5.

64. A network node comprising: one or more processors; and memory comprising instructions executable by the one or more processors whereby the network node is adapted to: define a channel access priority class 0 for a TXOP comprising one or more symbols of data of a first traffic type only; and transmit DL data of the first traffic type only to a UE according to the channel access priority class 0.

65. The network node of embodiment 64 wherein the network node is further adapted to operate according to the method of any one of embodiments 7-11.

66. A network node comprising: one or more processors; and memory comprising instructions executable by the one or more processors whereby the network node is adapted to: configure separate HARQ process identifiers (IDs), for DL and UL transmissions of a first traffic type and of a second traffic type; and provide HARQ feedback from the HARQ process ID associated with the traffic type of DL or UL transmission received.

67. The network node of embodiment 66 wherein the network node is further adapted to operate according to the method of any one of embodiments 13-18.

68. A network node comprising: one or more processors; and memory comprising instructions executable by the one or more processors whereby the network node is adapted to: determine that short PUCCH, and long PUCCH resources are shared for HARQ feedback for transmissions of a first traffic type and HARQ feedback for transmissions of a second traffic type from a plurality of UEs; and indicate to UEs transmitting the second traffic type that their allocated PUCCH resources should be switched to UEs transmitting the first traffic type.

69. The network node of embodiment 68 wherein the network node is further adapted to operate according to the method of any one of embodiments 20-23.

70. A network node comprising: one or more processors; and memory comprising instructions executable by the one or more processors whereby the network node is adapted to: allocate symbols for transmitting system information; transmit, to a UE an indication that one or more symbols allocated for the system information will be punctured for an URLLC, UL or DL transmission.

71. The network node of embodiment 70 wherein the network node is further adapted to operate according to the method of any one of embodiments 25-28.

72. A network node comprising one or more modules whereby the network node is adapted to operate according to the method of any one of embodiments 1-28.

73. A network node adapted to operate according to the method of any one of embodiments 1-28.

74. The network node of any of embodiments 62-73 wherein the network node comprises a gNB.

75. A computer program comprising instructions which, when executed on one or more processors, cause the one or more processors to carry out the method according to any one of embodiments 1-28.

76. A carrier containing the computer program of embodiment 75, wherein the carrier is one of an electronic signal, an optical signal, a radio signal, or a computer readable storage medium.

77. A UE comprising: one or more processors; and memory comprising instructions executable by the one or more processors whereby the UE is adapted to: receive, from a network node, parameters for CBG-level HARQ feedback for TXOPs, containing transmissions of a first traffic type; detect the presence of the transmissions of the first traffic type in a TXOP; and in response to detecting the transmissions of the first traffic type in the TXOP, switch to CBG-level HARQ feedback.
78. The UE of embodiment 77 wherein the UE is further adapted to operate according to the method of any one of embodiments 30-33.
79. A UE comprising: one or more processors; and memory comprising instructions executable by the one or more processors whereby the UE is adapted to: detect both a DL transmission of a first traffic type from a network node and a DL transmission of a second traffic type from the network node; and in response to detecting the DL transmissions of the first and second traffic types from the network node, prioritize DL HARQ feedback for a PDSCH DL transmission of the first traffic type over any pending DL HARQ feedback for a PDSCH DL transmission of the second traffic type.
80. The UE of embodiment 79 wherein the UE is further adapted to operate according to the method of any one of embodiments 35-38.
81. A UE comprising: one or more processors; and memory comprising instructions executable by the one or more processors whereby the UE is adapted to: receive, from a network node, information identifying symbol gaps within symbols previously allocated to the UE for an UL transmission of a first traffic type; determine whether data is available for an UL transmission of a second traffic type from the UE; and upon determining that data is available for the UL transmission of the second traffic type, puncture the UL transmission of the first traffic type with the UL transmission of the second traffic type within the identified symbol gaps.
82. The UE of embodiment 81 wherein the UE is further adapted to operate according to the method of any one of embodiments 40-53.
83. A UE comprising: one or more processors; and memory comprising instructions executable by the one or more processors whereby the UE is adapted to: receive, from a network node, an indication that control channel resources allocated to UEs transmitting a first traffic type should be switched to UEs transmitting a second traffic type; and in response to receiving the indication that the control channel resources allocated to the UEs transmitting the first traffic type should be switched to the UEs transmitting the second traffic type, refrain from transmitting HARQ feedback for the transmissions of the first traffic type in the indicated control channel resources.
84. The UE of embodiment 83 wherein the UE is further adapted to operate according to the method of any one of embodiments 55-59.
85. A UE comprising: one or more processors; and memory comprising instructions executable by the one or more processors whereby the UE is adapted to: receive, from a network node, signals that indicate that one or more symbols allocated for system information will be punctured for an URLLC, UL or DL transmission; decode a PDSCH, carrying the system information assuming puncturing; decode the PDSCH carrying the system information assuming no puncturing; and determine, based on decoding results, whether the system information was punctured or not punctured.
86. The UE of embodiment 85 wherein the UE is further adapted to operate according to the method of embodiment 61.
87. A UE comprising one or more modules whereby the UE is adapted to operate according to the method of any one of embodiments 29-61.
88. A UE adapted to operate according to the method of any one of embodiments 29-61.
89. A computer program comprising instructions which, when executed on one or more processors, cause the one or more processors to carry out the method according to any one of embodiments 29-61.
90. A carrier containing the computer program of embodiment 89, wherein the carrier is one of an electronic signal, an optical signal, a radio signal, or a computer readable storage medium.

The following acronyms are used throughout this disclosure.

μs Microseconds
3GPP Third Generation Partnership Project
5G Fifth Generation
ACK Acknowledgement
ASIC Application Specific Integrated Circuits
CBG Code Block Group
CCA Clear Channel Assessment
CPU Central Processing Unit
CW Contention Window
CWS Contention Window Size
D2D Device-to-Device
DCI Downlink Control Information
DFT Discrete Fourier Transform
DL Downlink
DSP Digital Signal Processor
eMBB Enhanced Mobile Broadband
eNB Evolved or Enhanced Node B
FPGA Field Programmable Gate Array
GHz Gigahertz
gNB New Radio Base Station
HARQ Hybrid Automatic Repeat Request
ID Identifier/Identity
kHz Kilohertz
LAA License Assisted Access
LBT Listen-Before-Talk
LTE Long Term Evolution
MBB Mobile Broadband
MCOT Maximum Channel Occupancy Time
MME Mobility Management Entity
ms Milliseconds
MTC Machine Type Communication
NACK Negative Acknowledgement
NB Node B
NR New Radio
NR-U New Radio Unlicensed
OFDM Orthogonal Frequency Division Multiplexing
PDCCH Physical Downlink Control Channel
PDSCH Physical Downlink Shared Channel
P-GW Packet Data Network Gateway
PRB Physical Resource Block
PUCCH Physical Uplink Control Channel
PUSCH Physical Uplink Shared Channel
RB Resource Block
RE Resource Element
Rel Release
RMSI Remaining Minimum System Information
SCEF Service Capability Exposure Function
TS Technical Specification
TXOP Transmission Opportunity
UE User Equipment
UL Uplink
URLLC Ultra-Reliable and Low Latency Communications Those skilled in the art will recognize improvements and modifications to the claims of the present disclosure. All such improvements and modifications are considered within the scope of the concepts disclosed herein.

What is claimed is:

1. A method of operation of a network node, the method comprising:
   determining that data is available for Downlink, DL, transmission of a first traffic type to a User Equipment, UE;
   identifying a DL transmission of a second traffic type to be punctured;
   transmitting the DL transmission of the first traffic type by puncturing the identified DL transmission of the second traffic type;
   receiving a Hybrid Automatic Repeat Request, HARQ, Negative Acknowledgement, NACK, associated with the punctured DL transmission of the second traffic type; and
   excluding the HARQ NACK associated with the punctured DL transmission of the second traffic type from a DL Contention Window Size, CWS, adjustment operation of the network node.

2. The method of claim 1 wherein the network node comprises a Fifth Generation, 5G, New Radio, NR, Base Station, gNB.

3. The method of claim 1 wherein the DL transmission of the first traffic type comprises an Ultra-Reliable Low Latency Communications, URLLC, transmission.

4. The method of claim 1 wherein the DL transmission of the second traffic type comprises a non-URLLC transmission.

5. The method of claim 4 wherein the non-URLLC transmission comprises an Enhanced Mobile Broadband, eMBB, transmission.

6. The method of claim 1 wherein the DL transmissions of the first and second traffic types comprise DL transmission in an unlicensed spectrum.

7. A method of operation of a User Equipment, UE, the method comprising:
   determining that data is available for Uplink, UL, transmission of a first traffic type to a network node;
   identifying an UL transmission of a second traffic type to be punctured;
   transmitting the UL transmission of the first traffic type by puncturing the identified UL transmission of the second traffic type;
   receiving a Hybrid Automatic Repeat Request, HARQ, Negative Acknowledgement, NACK, associated with the punctured UL transmission of the second traffic type; and
   excluding the HARQ NACK associated with the punctured UL transmission of the second traffic type from a UL Contention Window Size, CWS, adjustment operation of the UE.

8. The method of claim 7 wherein the network node comprises a Fifth Generation, 5G, New Radio, NR, Base Station, gNB.

9. The method of claim 7 wherein the UL transmission of the first traffic type comprises an Ultra-Reliable Low Latency Communications, URLLC, transmission.

10. The method of claim 7 wherein the UL transmission of the second traffic type comprises a non-URLLC transmission.

11. The method of claim 10 wherein the non-URLLC transmission comprises an Enhanced Mobile Broadband, eMBB, transmission.

12. The method of claim 7 wherein the UL transmissions of the first and second traffic types comprise UL transmission in an unlicensed spectrum.

13. A network node comprising:
    one or more processors; and
    memory comprising instructions executable by the one or more processors, whereby the network node is adapted to:
      determine that data is available for a Downlink, DL, transmission of a first traffic type to a User Equipment, UE;
      identify a DL transmission of a second traffic type to be punctured;
      transmit the DL transmission of the first traffic type by puncturing the identified DL transmission of the second traffic type;
      receive a Hybrid Automatic Repeat Request, HARQ, Negative Acknowledgement, NACK, associated with the punctured DL transmission of the second traffic type; and
      exclude the HARQ NACK associated with the punctured DL transmission of the second traffic type from a DL Contention Window Size, CWS, adjustment operation of the network node.

14. The network node of claim 13 wherein the network node comprises a Fifth Generation, 5G, New Radio, NR, Base Station, gNB.

15. The network node of claim 13 wherein the DL transmission of the first traffic type comprises an Ultra-Reliable Low Latency Communications, URLLC, transmission.

16. The network node of claim 13 wherein the DL transmission of the second traffic type comprises a non-URLLC transmission.

17. The network node of claim 16 wherein the non-URLLC transmission comprises an Enhanced Mobile Broadband, eMBB, transmission.

18. The network node of claim 13 wherein the DL transmissions of the first and second traffic types comprise DL transmissions in an unlicensed spectrum.

19. A User Equipment, UE, comprising:
    one or more processors; and
    memory comprising instructions executable by the one or more processors, whereby the UE is adapted to:
      determine that data is available for Uplink, UL, transmission of a first traffic type to a network node;
      identify an UL transmission of a second traffic type to be punctured;
      transmit the UL transmission of the first traffic type by puncturing the identified UL transmission of the second traffic type;
      receive a Hybrid Automatic Repeat Request, HARQ, Negative Acknowledgement, NACK, associated with the punctured UL transmission of the second traffic type; and
      exclude the HARQ NACK associated with the punctured UL transmission of the second traffic type from a UL Contention Window Size, CWS, adjustment operation of the UE.

20. The UE of claim 19 wherein the network node comprises a Fifth Generation, 5G, New Radio, NR, Base Station, gNB.

21. The UE of claim 19 wherein the UL transmission of the first traffic type comprises an Ultra-Reliable Low Latency Communications, URLLC, transmission.

22. The UE of claim 19 wherein the UL transmission of the second traffic type comprises a non-URLLC transmission.

23. The UE of claim 22 wherein the non-URLLC transmission comprises an Enhanced Mobile Broadband, eMBB, transmission.

24. The UE of claim 19 wherein the UL transmissions of the first and second traffic types comprise UL transmission in an unlicensed spectrum.

* * * * *